US010020024B2

(12) United States Patent
Lammers et al.

(10) Patent No.: US 10,020,024 B2
(45) Date of Patent: Jul. 10, 2018

(54) SMART GALLERY AND AUTOMATIC MUSIC VIDEO CREATION FROM A SET OF PHOTOS

(71) Applicant: Microsoft Technology Licensing, LLC, Redmond, WA (US)

(72) Inventors: Michael J. Lammers, Redwood City, CA (US); Seang Y. Chau, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 244 days.

(21) Appl. No.: 15/160,738

(22) Filed: May 20, 2016

(65) Prior Publication Data
US 2016/0267944 A1 Sep. 15, 2016

Related U.S. Application Data

(62) Division of application No. 13/870,867, filed on Apr. 25, 2013, now Pat. No. 9,369,662.

(51) Int. Cl.
G11B 27/036 (2006.01)
H04N 5/76 (2006.01)
(Continued)

(52) U.S. Cl.
CPC .......... *G11B 27/036* (2013.01); *G06K 9/6267* (2013.01); *G11B 27/10* (2013.01); *H04N 1/00198* (2013.01); *H04N 5/76* (2013.01)

(58) Field of Classification Search
CPC ..... G06T 5/006; G06T 5/009; H04N 13/0203; H04N 13/0225; H04N 13/0271; H04N 19/97; H04N 1/40062; H04N 1/56; H04N 1/62; H04N 5/23219; H04N 5/23232; H04N 5/23254; H04N 5/23277; H04N 5/23293
See application file for complete search history.

(56) References Cited

U.S. PATENT DOCUMENTS 7,720,364 B2  5/2010  Scott et al.
9,369,662 B2  6/2016  Lammers et al.
(Continued)

FOREIGN PATENT DOCUMENTS

CN   101272457 A   9/2008
CN   101297545 A   10/2008

OTHER PUBLICATIONS

"First Office Action and Search Report Issued in Chinese Patent Application No. 201480023222.3", dated Nov. 2, 2017, 13 Pages.
(Continued)

Primary Examiner — Trung Diep
(74) Attorney, Agent, or Firm — Schwegman Lundberg & Woessner, P.A.

(57) ABSTRACT

Various embodiments provide a so-called smart gallery that is designed to create a short summary view of a collection of content, such as photographs and video. The content can be prioritized and presented in a smart gallery user interface that includes gallery elements that can be sized in accordance with prioritized content. Prioritization can take place based on whether content is manually captured or automatically captured. Alternately or additionally, prioritization can take place based on content analysis that looks at content quality and/or objects that appear in the content.

20 Claims, 17 Drawing Sheets

(51) Int. Cl.
*H04N 1/00* (2006.01)
*G06K 9/62* (2006.01)
*G11B 27/10* (2006.01)

(56) References Cited

U.S. PATENT DOCUMENTS

| | | | |
|---|---|---|---|
| 2006/0007328 A1 | 1/2006 | Paulsen et al. | |
| 2008/0192129 A1* | 8/2008 | Walker | G11B 27/034 348/231.2 |
| 2009/0016073 A1* | 1/2009 | Higgins-Luthman | B60Q 1/085 362/465 |
| 2009/0016645 A1 | 1/2009 | Sako et al. | |
| 2009/0096897 A1 | 4/2009 | Saito | |
| 2010/0194963 A1* | 8/2010 | Terashima | G06F 17/3028 348/333.11 |
| 2010/0331047 A1 | 12/2010 | Bilcu et al. | |
| 2012/0002881 A1* | 1/2012 | Maeda | G06K 9/00677 382/195 |
| 2012/0076427 A1 | 3/2012 | Hibino et al. | |
| 2012/0170855 A1* | 7/2012 | Maeda | G06F 17/30247 382/218 |
| 2012/0242844 A1 | 9/2012 | Walker et al. | |
| 2013/0021505 A1* | 1/2013 | Plowman | H04N 5/357 348/241 |
| 2014/0250132 A1 | 9/2014 | Pollak | |
| 2014/0320697 A1 | 10/2014 | Lammers et al. | |

OTHER PUBLICATIONS

"Autographer", Retrieved from <http://www.autographer.com/#home> on Mar. 15, 2013, 2012, 3 pages.

"Final Office Action", U.S. Appl. No. 13/870,867, dated Sep. 4, 2015, 12 pages.

"International Search Report and Written Opinion", Application No. PCT/US2014/035060, dated Aug. 13, 2014, 9 Pages.

"Memoto Lifelogging Camera", Retrieved from <http://www.kickstarter.com/projects/martinkallstrom/memoto-lifelogging-camera/> on Mar. 13, 2013, Oct. 23, 2012, 24 pages.

"Memoto", Retrieved from <http://memoto.com> on Mar. 15, 2013, 2013, 3 pages.

"Non-Final Office Action", U.S. Appl. No. 13/870,867, dated Jan. 4, 2016, 7 pages.

"Non-Final Office Action", U.S. Appl. No. 13/870,867, dated Apr. 22, 2015, 11 pages.

"Notice of Allowance", U.S. Appl. No. 13/870,867, dated Feb. 17, 2016, 7 pages.

"Restriction Requirement", U.S. Appl. No. 13/870,867, dated Jan. 7, 2015, 5 pages.

Cui, "EasyAlbum: An Interactive Photo Annotation System Based on Face Clustering and Re-Ranking", Proceeding of the SIGCHI Conference on Human Factors in Computing Systems, Apr. 28, 2007, pp. 367-376.

Gemmell, "Passive Capture and Ensuing Issues for a Personal Lifetime Store", Proceedings of the 1st ACM workshop on Continuous Archival and Retrieval of Personal Experiences, Available at <http://www.vis.uky.edu/~cheung/courses/ee639_fall04/homeworks/d48.pdf>, Oct. 15, 2004, pp. 48-55.

Girgensohn, "Simplifying the Management of Large Photo Collections", International Conference on Human-Computer Interaction, Available at <http://citeseerx.ist.psu.edu/viewdoc/download?doi=10.1.1.91.2077&rep=rep1&type=pdf>, Sep. 1, 2003, 8 pages.

Kahn, "Google+ Updated With Album Organizer for Sorting, Moving and Batch Deleting Photos", Retrieved from <http://9to5google.com/2012/03/14/google-updated-with-album-organizer-for-sorting-moving-and-batch-deleting-photos/> on Mar. 13, 2013, Mar. 14, 2012, 4 Pages.

Yang, "Semantic Image Browser: Bridging Information Visualization with Automated Intelligent Image Analysis", IEEE Symposium on Visual Analytics Science and Technology, Available at <http://viscenter.uncc.edu/sites/viscenter.uncc.edu/files/CVC-UNCC-06-02.pdf>, Oct. 31, 2006, 8 pages.

* cited by examiner

SMART GALLERY AND AUTOMATIC MUSIC VIDEO CREATION FROM A SET OF PHOTOS

RELATED APPLICATIONS

This application is a divisional of and claims priority to U.S. patent application Ser. No. 13/870,867 filed Apr. 25, 2013, entitled "Smart Gallery and Automatic Music Video Creation from a Set of Photos," the disclosure of which is incorporated by reference herein in its entirety.

BACKGROUND

Today users have a variety of ways to collect content. For example, users can take pictures and video using a digital camera, a smart phone, and other electronic devices. This can result in a large amount of content. Efforts continue to evolve with respect to enabling users to share and consume both their content and the content of others.

SUMMARY

This Summary is provided to introduce a selection of concepts in a simplified form that are further described below in the Detailed Description. This Summary is not intended to identify key features or essential features of the claimed subject matter.

Various embodiments provide a so-called smart gallery that is designed to create a short summary view of a collection of content, such as photographs and video. The content can be prioritized and presented in a smart gallery user interface that includes gallery elements that can be sized in accordance with prioritized content. Prioritization can take place based on whether content is manually captured or automatically captured. Alternately or additionally, prioritization can take place based on content analysis that looks at content quality and/or objects that appear in the content.

Various embodiments provide a wearable camera that can be worn by a user. In one or more embodiments, the wearable camera can automatically take a series of photos and save those photos on the camera. The series of photos can be analyzed for various characteristics and properties. These characteristics and properties can be used to automatically select music from a music library. The music can then be used to create a video slideshow that includes music tailored to the characteristics and properties of the pictures. A link to an associated video file can be provided for sharing the video slideshow.

In other embodiments, characteristics and properties of music can be analyzed and music can be selected for a video slideshow. The video slideshow can be presented with the music as a function of the characteristics and properties of the music. For example, a beat of the accompanying music can be detected and the photos can be changed in a manner that is beat-matched to the accompanying music.

In at least some other embodiments, the wearable camera is able to incorporate geo-location in connection with the photos that it takes. Geo-location data can then be used to select music to accompany the video slideshow.

BRIEF DESCRIPTION OF THE DRAWINGS

The detailed description references the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
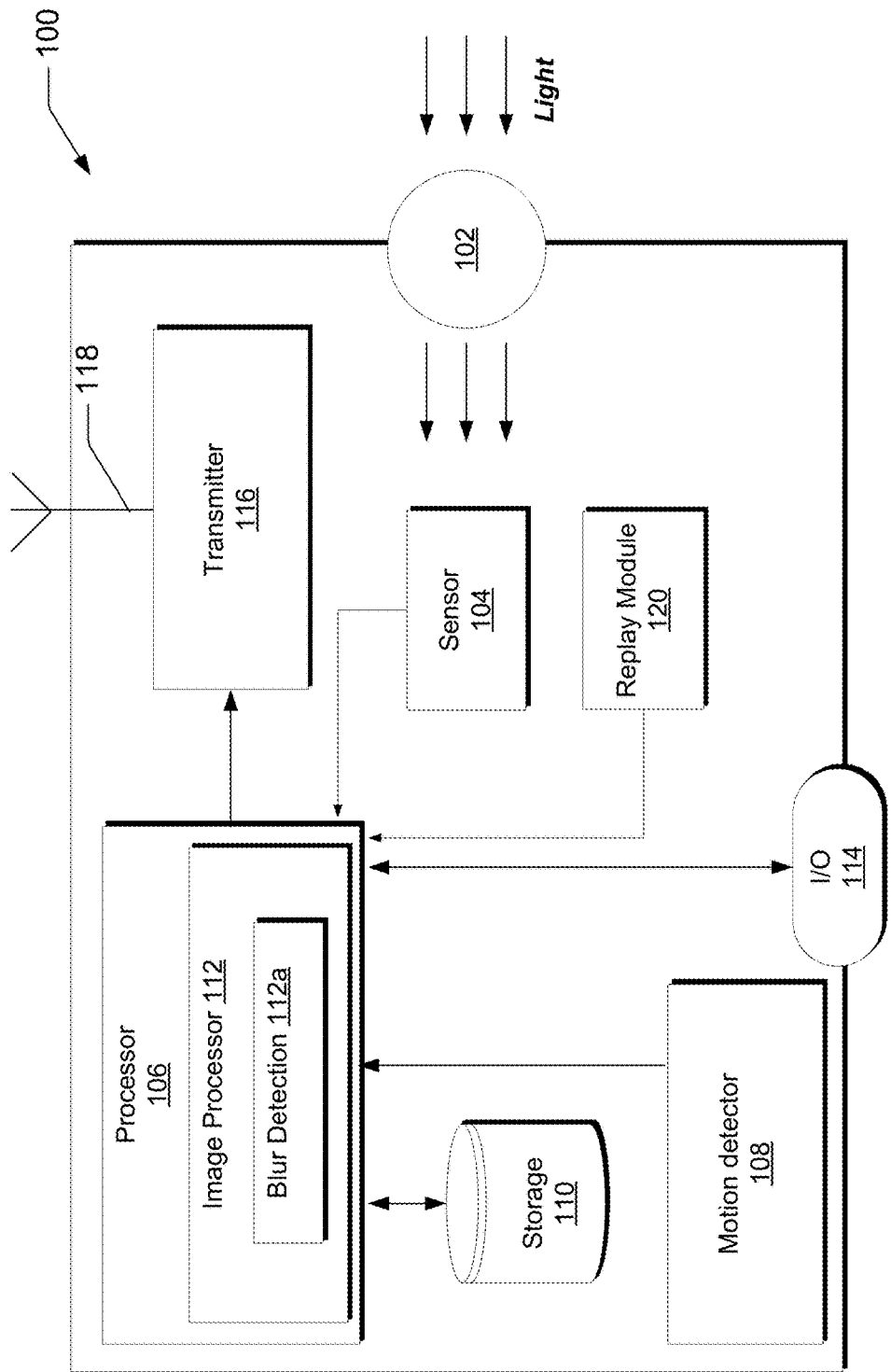
FIG. 1 is an example camera device in accordance with one or more embodiments.

Various embodiments provide a so-called smart gallery that is designed to create a short summary view of a collection of content, such as photographs and video. The content can be prioritized and presented in a smart gallery user interface that includes gallery elements that can be sized in accordance with prioritized content. Prioritization can take place based on whether content is manually captured or automatically captured. Alternately or additionally, prioritization can take place based on content analysis that looks at content quality and/or objects that appear in the content.

Various embodiments provide a wearable camera that can be worn by a user. In one or more embodiments, the wearable camera can automatically take a series of photos and save those photos on the camera. The series of photos can be analyzed for various characteristics and properties. These characteristics and properties can be used to automatically select music from a music library. The music can then be used to create a video slideshow that includes music tailored to the characteristics and properties of the pictures. A link to an associated video file can be provided for sharing the video slideshow.

In other embodiments, characteristics and properties of music can be analyzed and music can be selected for a video slideshow. The video slideshow can be presented with the music as a function of the characteristics and properties of the music. For example, a beat of the accompanying music can be detected and the photos can be changed in a manner that is beat-matched to the accompanying music.

In at least some other embodiments, the wearable camera is able to incorporate geo-location in connection with the photos that it takes. Geo-location data can then be used to select music to accompany the video slideshow.

The camera can be worn in any suitable location. For example, the camera can be worn on a user's head such as, a way of example and not limitation, a hat-mounted camera, glasses-mounted camera, headband-mounted camera, helmet-mounted camera, and the like. Alternately or additionally, the camera can be worn on locations other than the user's head. For example, the camera can be configured to be mounted on the user's clothing.

Various other embodiments provide a wearable camera that is mountable on a user's clothing. The camera is designed to be unobtrusive and user-friendly insofar as being mounted away from the user's face so as not to interfere with their view. In at least some embodiments, the camera includes a housing and a clip mounted to the housing to enable the camera to be clipped onto the user's clothing. The camera is designed to be lightweight with its weight balanced in a manner that is toward the user when clipped to the user's clothing.

In one or more embodiments, the camera includes a replay mode. When the replay mode is selected, the camera automatically captures image data, such as video or still images, and saves the image data to a memory buffer. In at least some embodiments, the size of the memory buffer can be set by the user to determine how much image data is to be collected. Once the memory buffer is full, the older image data is erased to make room for currently-captured image data. If an event occurs that the user wishes to memorialize through video or still images, a record button can be activated which saves the image data from the beginning of the memory buffer and continues recording until the user presses the record button again. In this manner, if an event occurs, the user is assured of capturing the event from a time t−x, where x is the length of the memory buffer, in time.

In the discussion that follows, a section entitled "Example Environment" describes an example environment in which the various embodiments can be utilized. Next, a section entitled "Replay Functionality" describes an example replay mode in accordance with one or more embodiments. Next, a section entitled "Duel Encoding" describes an embodiment in which captured image data can be dual encoded in accordance with one or more embodiments. Next, a section entitled "Photo Log" describes an example photo log in accordance with one or more embodiments. Following this, a section entitled "Music Video Creation from a Set of Photos" describes how an automatic music video can be created in accordance with one or more embodiments. Next, a section entitled "Selecting Music Based on Characteristics and Properties of Photos" describes how music can be selected based on various photo characteristics and properties. Following this, a section entitled "Presenting the Video Slideshow as a Function of Characteristics and Properties of Music" describes aspects of a video slideshow in accordance with one or more embodiments. Next, a section entitled "Using Geo-location to Select Songs for a Video Slideshow" describes how geo-location can be used in accordance with one or more embodiments. Following this, a section entitled "Using Motion Data to Select Music" describes how motion data can be used to select music for a video slideshow in accordance with one or more embodiments. Next, a section entitled "Smart Gallery" describes a content gallery in accordance with one or more embodiments. Following this, a section entitled "Smart Gallery User Interface" describes a user interface associated with the smart gallery in accordance with one or more embodiments. Next, sections entitled "First Approach" and "Second Approach" describes various approaches for enabling content to be consumed using the smart gallery. Following this, a section entitled "Consumption Scenarios" describes various scenarios in which content can be consumed using the smart gallery in accordance with one or more embodiments. Last, a section entitled "Example Device" describes an example device that can be used to implement the embodiments described herein, in accordance with one or more embodiments.

Consider now an example environment in which various embodiments can be practiced.

Example Environment

FIG. 1 illustrates a schematic of a camera device 100 in accordance with one or more embodiments. The camera device 100 includes a lens 102 having a focal length that is suitable for covering a scene to be pictured. In one embodiment, a mechanical device may be included with the lens 102 to enable auto or manual focusing of the lens. In another embodiment, the camera device 100 may be a fixed focus device in which no mechanical assembly is included to move the lens 102. A sensor 104 having a sensing surface (not shown) is also included to convert an image formed by the incoming light on the sensing surface of the sensor 104 into a digital format. The sensor 104 may include a charge-coupled device (CCD) or complementary metal oxide semiconductor (CMOS) image sensor for scanning the incoming light and creating a digital picture. Other technologies or devices may be used so long as the used device is capable of converting an image formed by the incoming light on a sensing surface into the digital form. Typically, these image detection devices determine the effects of light on tiny light sensitive devices and record the changes in a digital format.

It should be appreciated that the camera device 100 may include other components such as a battery or power source and other processor components that are required for a processor to operate. However, to avoid obfuscating the teachings, these well-known components are being omitted. In one embodiment, the camera device 100 does not include a view finder or a preview display. In other embodiments, however, a preview display may be provided. The techniques described herein can be used in any type of camera, and are particularly effective in small, highly portable cameras, such as those implemented in mobile telephones and other portable user equipment. Thus, in one embodiment, the camera device 100 includes hardware or software for making and receiving phone calls. Alternatively, the camera device 100 can be a dedicated, stand-alone camera.

In at least some embodiments, the camera device 100 further includes a motion detector 108 that can include an accelerometer and, in some embodiments, a gyroscope. The accelerometer is used for determining the direction of gravity and acceleration in any direction. The gyroscope may also be used either in addition to the accelerometer or instead of the accelerometer. The gyroscope can provide information about how the rotational angle of the camera device 100 changes over time. Any other type of sensor may be used to detect the camera's motion. Using the rotational angle, an angle of rotation of the camera device 100 may be calculated, if the camera device 100 is rotated.

Further included is an input/output (I/O) port 114 for connecting the camera device 100 to an external device, including a general purpose computer. The I/O port 114 may be used for enabling the external device to configure the camera device 100 or to upload/download data. In one embodiment, the I/O port 114 may also be used for streaming video or pictures from the camera device 100 to the external device. In one embodiment, the I/O port may also be used for powering the camera device 100 or charging a rechargeable battery (not shown) in the camera device 100.

The camera device 100 may also include an antenna 118 that is coupled to a transmitter/receiver (Tx/Rx) module 116. The Tx/Rx module 116 is coupled to a processor 106. The antenna 118 may be fully or partly exposed outside the body of the camera device 100. However, in another embodiment, the antenna 118 may be fully encapsulated within the body of the camera device 100. The Tx/Rx module 116 may be configured for Wi-Fi transmission/reception, Bluetooth transmission/reception or both. In another embodiment, the Tx/Rx module 116 may be configured to use a proprietary protocol for transmission/reception of the radio signals. In yet another embodiment, any radio transmission or data transmission standard may be used so long as the used standard is capable of transmitting/receiving digital data and control signals. In one embodiment, the Tx/Rx module 116 is a low power module with a transmission range of less than ten feet. In another embodiment, the Tx/Rx module 116 is a low power module with a transmission range of less than five feet. In other embodiments, the transmission range may be configurable using control signals received by the camera device 100 either via the I/O port 114 or via the antenna 118.

The camera device 100 further includes a processor 106. The processor 106 is coupled to, among other components, the sensor 104 and the motion detector 108. The processor 106 may also be coupled to storage 110, which, in one embodiment, is external to the processor 106. The storage 110 may be used for storing programming instructions for controlling and operating other components of the camera device 100. The storage 110 may also be used for storing captured media (e.g., pictures and/or videos). In another embodiment, the storage 110 may be a part of the processor 106 itself.

In one embodiment, the processor 106 may include an image processor 112 having a blur detection component 112*a* that operates as described above and below. The image processor 112 may be a hardware component or may also be a software module that is executed by the processor 106. It may be noted that the processor 106 and/or the image processor 112 may reside in different chips. For example, multiple chips may be used to implement the processor 106. In one example, the image processor 112 may be a Digital Signal Processor (DSP). The image processor can be configured as a processing module, that is a computer program executable by a processor. In at least some embodiments, the processor 112 is used to process a raw image received from the sensor 104 based, at least in part, on the input received from the motion detector 108. Other components such as Image Signal Processor (ISP) may be used for image processing.

In one embodiment, the storage 110 is configured to store both raw (unmodified image) and the corresponding modified image. In one or more embodiments, the storage 110 can include a memory buffer, such as a flash memory buffer, that can be used as a circular buffer to facilitate capturing image data when the camera is set to a replay mode that is supported by replay module 120. The replay module 120 can be implemented in connection with any suitable hardware, software, firmware, or combination thereof. When the replay mode is selected, the camera automatically captures image data, such as video or still images, and saves the image data to the memory buffer. In at least some embodiments, the size of the memory buffer can be set by the user to determine how much image data is to be collected. If an event occurs that the user wishes to memorialize through video or still images, in some embodiments, a record button can be activated which saves the image data from the beginning of the memory buffer and continues recording until the user presses the record button again. In this manner, if an event occurs, the user is assured of capturing the event from a time t−x, where x is the length of the memory buffer, in time.

A processor buffer (not shown) may also be used to store the image data. The pictures can be downloaded to the external device via the I/O port 114 or via the wireless channels using the antenna 118. In one embodiment, both unmodified and modified images are downloaded to the external device when the external device sends a command to download images from the camera device 110. In one embodiment, the camera device 100 may be configured to start capturing a series of images at a selected interval.

In one embodiment, a raw image from the sensor 104 is inputted to an image processor (such as an ISP) for image processing or blur detection. After image processing is applied to the image outputted by the image processor, the modified image is encoded. The image encoding is typically performed to compress the image data.

In an example embodiment, the camera device 100 may not include the components for processing the image captured by the sensor 104. Instead, the camera device 100 may include programming instructions to transmit the raw image after extracting the image from the sensor 104 to a cloud based processing system that is connected to the camera device 100 via the Internet or a local area network. The cloud based system is configured to receive the raw image and process the image or images as described above and below. The encoded image is then either stored in a selected cloud based storage or the image is sent back to the camera device 100 or to any other device according to a user configuration. The use of a cloud based image processing system can reduce a need for incorporating several image processing components in each camera device, thus making a camera device lighter, more energy efficient and cheaper.

In at least some embodiments, the cloud based system can be configured to automatically create music video slideshows from sets of photos that are provided from camera device 100, as described below in more detail.

In another example embodiment, instead of a cloud based image processing, the camera device 100 may send either a raw image or the image processed through an image processor to another device, e.g., a mobile phone or a computer. The image may be transmitted to the mobile phone (or a computer) for further processing via Wi-Fi, Bluetooth or any other type of networking protocol that is suitable for transmitting digital data from one device to another device. After the mobile device or computer receives the image or images, according to one or more embodiments described herein, the produced image may be saved to local storage on the device, transferred for storage in a cloud based storage system, or transmitted to another device, according to user or system configurations. In at least some embodiments, the computer can be configured to automatically create music video slideshows from sets of photos that are provided from camera device 100, as described below in more detail.

In one embodiment, the native image processing system in the camera device 100 may produce images and/or videos in a non-standard format. For example, a 1200×1500 pixel image may be produced. This may be done by cropping, scaling, or using an image sensor with a non-standard resolution. Since methods for transforming images in a selected standard resolution are well-known, there will be no further discussion on this topic.

Various embodiments described above and below can be implemented utilizing a computer-readable storage medium that includes instructions that enable a processing unit to implement one or more aspects of the disclosed methods as well as a system configured to implement one or more aspects of the disclosed methods. By "computer-readable storage medium" is meant all statutory forms of media. Accordingly, non-statutory forms of media such as carrier waves and signals per se are not intended to be covered by the term "computer-readable storage medium".

As noted above, camera device 100 can assume any suitable form of wearable camera. The camera can be worn in any suitable location relative to a user. For example, the camera can be worn on a user's head such as, by a way of example and not limitation, a hat-mounted camera, glasses-mounted camera, headband-mounted camera, helmet-mounted camera, and the like. Alternately or additionally, the camera can be worn on locations other than the user's head. For example, the camera can be configured to be mounted on the user's clothing or other items carried by a user, such as a backpack, purse, briefcase, and the like.

In the example provided just below, a wearable camera is described in the context of a camera that is mountable on the user's clothing. It is to be appreciated and understood, however, that other types of non-clothing mountable, wearable cameras can be utilized without departing from the spirit and scope of the claimed subject matter.

Figure 2:
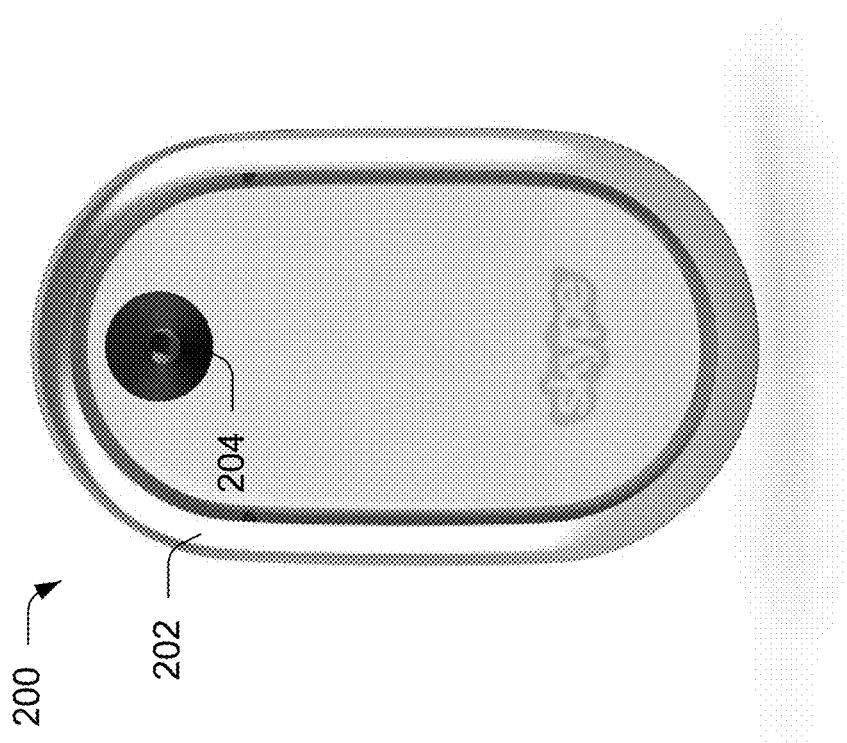
FIG. 2 illustrates an example camera device in accordance with one or more embodiments.
Figure 3:
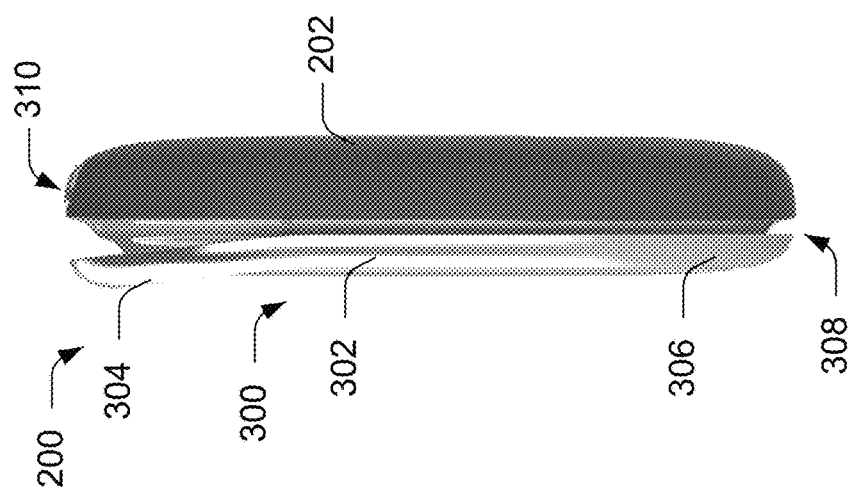
FIG. 3 illustrates an example camera device in accordance with one or more embodiments.

Moving on to FIGS. 2 and 3, consider the following. FIG. 2 illustrates an example camera device 200 in a front elevational view, while FIG. 3 illustrates the camera device 200 in a side elevational view. The camera device 200 includes a housing 202 that contains the components described in FIG. 1. Also illustrated is a camera lens 204 (FIG. 2) and a fastening device 300 (FIG. 3) in the form of a clip that operates in a manner that is similar to a clothespin. Specifically, the fastening device 300 includes a prong 302 with a body having a thumb-engageable portion 304. The body extends along an axis away from the thumb-engageable portion 304 toward a distal terminus 306. A spring mechanism, formed by the body or separate from and internal relative to the body, enables prong 302 to be opened responsive to pressure being applied to the thumb-engageable portion 304. When opened, a piece of clothing can be inserted into area 308. When the thumb-engageable portion 304 is released, the clothing is clamped in place by the prong 302 thereby securely mounting the camera device on a piece of clothing. For example, the camera device can be mounted, as described above, on a necktie, blouse, shirt, pocket, and the like.

In addition, camera device 200 can include a number of input buttons shown generally at 310. The input buttons can include, by way of example and not limitation, an input button to take a still picture, an input button to initiate the replay mode, an input button to initiate a video capture mode, and an input button to enable the user to adjust the buffer size that is utilized during the replay mode. In some embodiments, the input button to initiate the replay mode can be eliminated through the use of the non-touch switch as described below in more detail. It is to be appreciated and understood that the various input buttons can be located anywhere on the camera device 200.

It may be noted that even though the camera device 200 is shown to have a particular shape, the camera device 100 can be manufactured in any shape and size suitable and sufficient to accommodate the above described components of the camera device 100. The housing 202 of the camera device may be made of a metal molding, a synthetic material molding or a combination thereof. In other embodiments, any suitable type of material may be used to provide a durable and strong outer shell for typical portable device use.

In addition, the fastening device 300 can comprise any suitable type of fastening device. For example, the fastening device may be a simple slip-on clip, a crocodile clip, a hook, a Velcro or a magnet or a piece of metal to receive a magnet. The camera device 200 may be affixed permanently or semi-permanently to another object using the fastening device 300.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, the camera device 200 may include a computer-readable medium that may be configured to maintain instructions that cause the camera's software and associated hardware to perform operations. Thus, the instructions function to configure the camera's software and associated hardware to perform the operations and in this way result in transformation of the software and associated hardware to perform functions. The instructions may be provided by the computer-readable medium to the camera device through a variety of different configurations.

One such configuration of a computer-readable medium is signal bearing medium and thus is configured to transmit the instructions (e.g., as a carrier wave) to the camera device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Having considered an example operating environment in accordance with one or more embodiments, consider now a discussion of replay functionality and other features that can be provided by the camera device.

Replay Functionality

As noted above, camera device 200 includes a replay mode. When the replay mode is selected, as by the user pressing an input button associated with initiating the replay mode, the camera automatically captures image data, such as video or still images, and saves the image data to a memory buffer. In one or more embodiments, the memory buffer is a circular buffer that saves an amount of image data, for example video data. When the memory buffer is full of image data, it deletes the oldest image data to make room for newly recorded image data. This continues until either the user exits the replay mode or presses a button associated with initiating video capture, i.e. the "record" button.

In at least some embodiments, the size of the memory buffer can be set by the user to determine how much image data is to be collected. As an example, the user might set the length of the memory buffer to correspond to 5 seconds, 30 seconds, 1 minute, 2 minutes, and longer.

Assume now that an event occurs that the user wishes to memorialize through video or still images. Assume also that the user has initiated the replay mode so that video data is currently being buffered in the memory buffer. By pressing the "record" button, the video data is now saved from the beginning of the memory buffer and recording continues until the user presses the record button again.

In this manner, if an event occurs, the user is assured of capturing the event from a time t–x, where x is the length of the memory buffer, in time. So, for example, if the user initially set the memory buffer to capture 2 minutes worth of video data, by pressing the "record" button, the last 2 minutes of video data will be recorded in addition to the currently recorded video data.

In one or more embodiments, the memory buffer comprises flash memory. When the user presses the "record" button, and the camera device is in replay mode, a pointer is used to designate where, in flash memory, the beginning of the captured video data occurs, e.g., the beginning of the last 2 minutes of video data prior to entering the "record" mode. In other embodiments, the video data captured during replay mode and "record" mode can be written to an alternate storage location.

Figure 4:
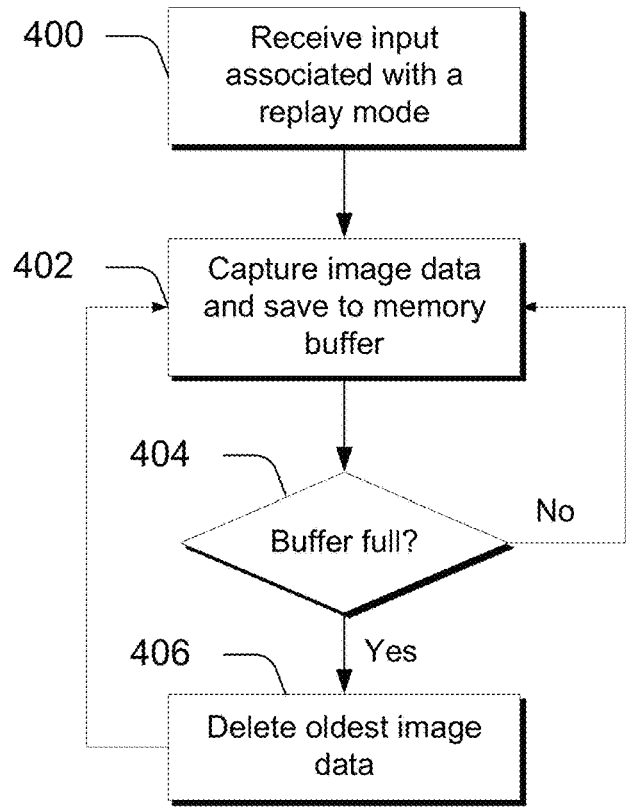
FIG. 4 is a flow diagram that describes steps in a method in accordance with one or more embodiments.

FIG. 4 is a flow diagram that describes steps in a method in accordance with one or more embodiments. The method can be performed in connection with any suitable hardware, software, firmware, or combination thereof. In at least some embodiments, the method is performed by a suitably-configured camera device such as the one described above.

Step 400 receives input associated with a replay mode. This step can be performed in any suitable way. For example, in at least some embodiments, this step can be performed by receiving input from the user via a suitable input device on the camera device. Responsive to receiving the input associated with the replay mode, step 402 captures image data and saves the image data to a memory buffer. Step 404 ascertains whether the buffer is full. If the buffer is not full, the method returns to step 402 and continues to capture image data and save image data to the memory buffer. If, on the other hand, the buffer is full, step 406 deletes the oldest image data in the memory buffer and returns to step 402 to capture subsequent image data.

This process continues until either the user presses the "record" button, or exits the replay mode.

Figure 5:
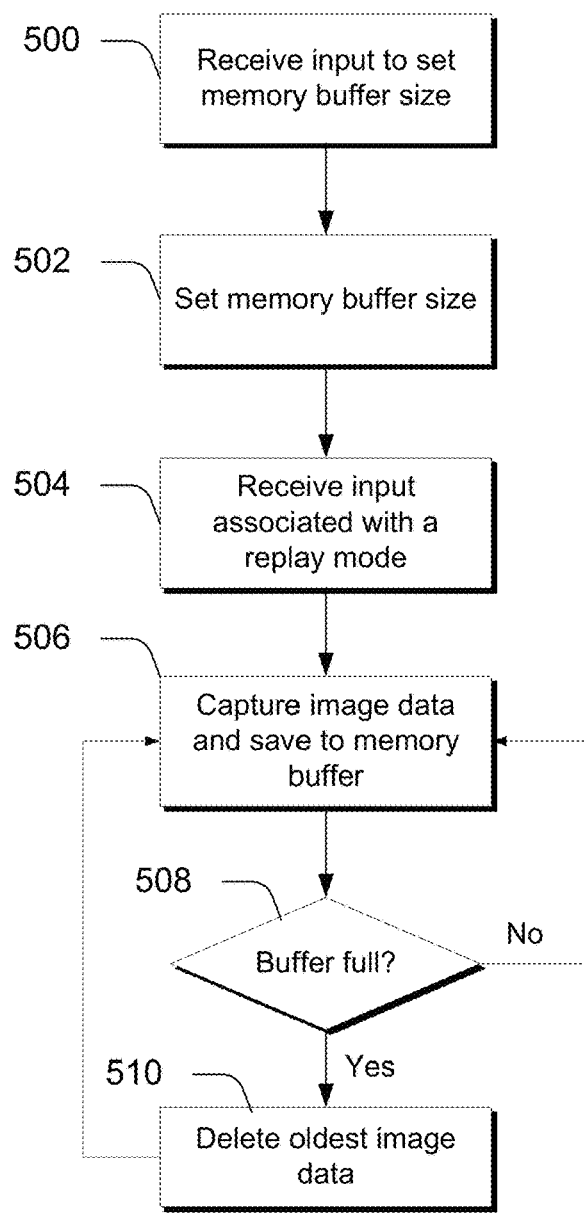
FIG. 5 is a flow diagram that describes steps in a method in accordance with one or more embodiments.

FIG. 5 is a flow diagram that describes steps in another method in accordance with one or more embodiments. The method, which allows a user to set the camera device's memory buffer size, can be performed in connection with any suitable hardware, software, firmware, or combination thereof. In at least some embodiments, the method is performed by a suitably-configured camera device such as the one described above.

Step 500 receives input to set a memory buffer size. This step can be performed in any suitable way. For example, in at least some embodiments, the step can be performed by receiving user input by way of a suitably-configured input mechanism such as a button on the camera device. Responsive to receiving this input, step 502 sets the memory buffer size.

Step 504 receives input associated with a replay mode. This step can be performed in any suitable way. For example, in at least some embodiments, this step can be performed by receiving input from the user via a suitable input device on the camera device. Responsive to receiving the input associated with the replay mode, step 506 captures image data and saves the image data to a memory buffer. Step 508 ascertains whether the buffer is full. If the buffer is not full, the method returns to step 506 and continues to capture image data and save image data to the memory buffer. If, on the other hand, the buffer is full, step 510 deletes the oldest image data in the memory buffer and returns to step 506 to capture subsequent image data.

This process continues until the user presses the "record" button or exits the replay mode.

Figure 6:
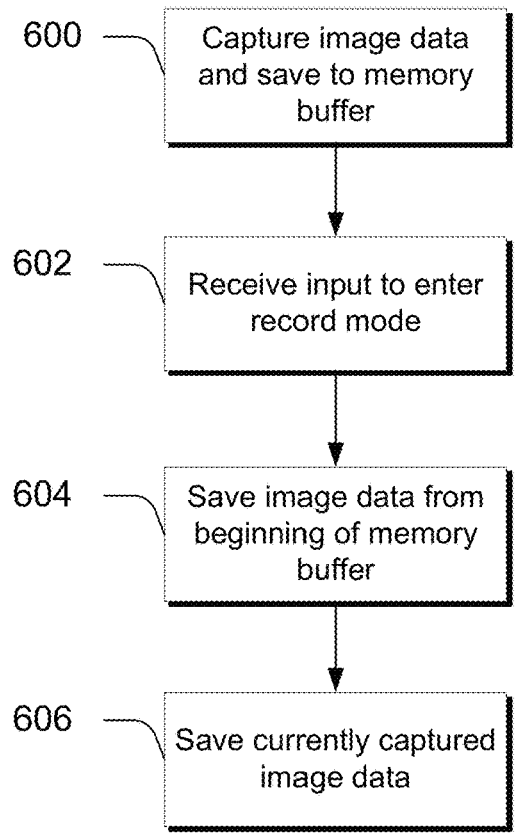
FIG. 6 is a flow diagram that describes steps in a method in accordance with one or more embodiments.

FIG. 6 is a flow diagram that describes steps in another method in accordance with one or more embodiments. The method can be performed in connection with any suitable hardware, software, firmware, or combination thereof. In at least some embodiments, the method is performed by a suitably-configured camera device such as the one described above.

Step 600 captures image data and saves the image data to a memory buffer. The step can be performed in any suitable way. For example, the step can be performed as described in connection with FIG. 4 or 5. Step 602 receives input to enter the camera device's record mode. This step can be performed, for example, by receiving user input by way of a "record" button. Responsive to receiving the input to enter record mode, step 604 saves image data from the beginning of the memory buffer. This step can be performed in any suitable way. For example, the step can be performed by setting a pointer to point to the beginning of the memory buffer. Step 606 saves currently captured image data in addition to the image data from the beginning of the memory buffer. This step can be performed until the user presses the "record" button once more.

Having considered an example replay mode and how it can be implemented with a suitably-configured camera device, consider now aspects of a dual encoding process.

Dual Encoding

In one or more embodiments, the camera device's processor 106 (FIG. 1) is configured to encode image data at different levels of resolution. For example, the camera device can encode image data at a low level of resolution and at a high level of resolution as well. Any suitable levels of resolution can be utilized. In at least some embodiments, the low level of resolution is Quarter-VGA (e.g., 320×240) and the high level of resolution is 720p (e.g., 1280×720).

Encoding image data at different resolutions levels can enhance the user's experience insofar as giving the user various options to transfer the saved image data. For example, at lower resolution levels, the captured image data can be streamed to a device such as a smart phone. Alternately or additionally, at higher resolution levels, when the user has Wi-Fi accessibility, they can transfer the image data to a network device such as a laptop or desktop computer.

Having considered a dual encoding scenario, consider now aspects of a photo log that can be constructed using the principles described above.

Photo Log

Photo log refers to a feature that enables a user to log their day in still photos at intervals of their own choosing. So, for example, if the user wishes to photo log their day at every 3 minutes, they can provide input to the camera device so that every 3 minutes the camera automatically takes a still photo and saves it. At the end of the day, the user will have documented their day with a number of different still photos.

In at least some embodiments, the photo log feature can work in concert with the replay mode described above. For example, if the user has entered the replay mode by causing image data to be captured and saved to the memory buffer, the camera device's processor can process portions of the captured video data at defined intervals to provide the still photos. This can be performed in any suitable way. For example, the camera device's processor can process the video data on the camera's photosensor and read predefined areas of the photosensor to process the read areas into the still photos. In some instances the photo format is a square format so that the aspect ratio is different from that aspect ratio of the video data.

Music Video Creation from a Set of Photos

In one or more embodiments, a series of photos or content can be automatically turned into a music video or video slideshow. As an example, consider the photo log feature described just above. Using the photo log feature, users can document their day in a series of photos taken at periodic intervals. So, for example, the user may don the camera, set the camera to take pictures every 3 minutes, and proceed to go about their day. At the end of the day the user will have a large number of photos. These photos can then be processed to create a music video slideshow as described below. Creation of the music video slideshow can take place in any suitable location using any suitable computing device. In at least some embodiments, the photos can be processed by a local client device, such as a desktop computer. Alternately or additionally, the photos can be processed by a cloud service, such as that described above.

Selecting Music Based on Characteristics and Properties of Photos

As noted above, various embodiments provide a wearable camera that can be worn by a user. In one or more embodiments, the wearable camera can automatically take a series of photos and save those photos on the camera. The series of photos can be analyzed for various characteristics and properties. These characteristics and properties can be used to automatically select music from a music library. The music can then be used to create a video slideshow that includes music tailored to the characteristics and properties of the pictures. A link to an associated video file can be provided for sharing the video slideshow.

Figure 7:
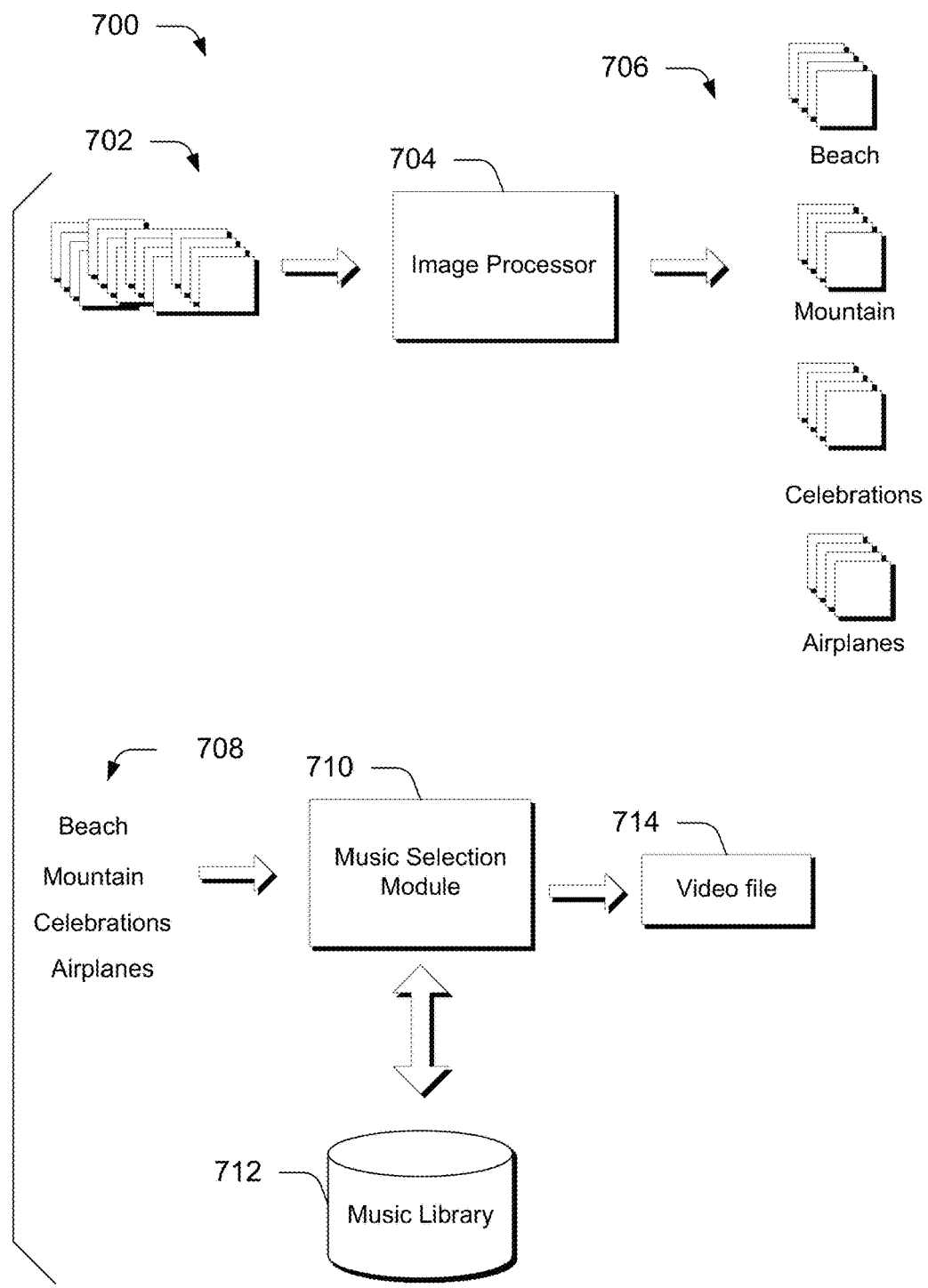
FIG. 7 illustrates an example system in accordance with one or more embodiments.

As an example, consider FIG. 7 which illustrates a system in accordance with one or more embodiments generally at 700. In this example, the wearable camera has taken a series of photographs shown generally at 702. The series of photographs 702 have been provided by the wearable camera to a suitably-configured computing device, such as a local computing device or a computing device provided by a cloud service. The series of photographs 702 are processed by an image processor 704. Any suitable type of image processing technology can be used to process the series of photographs. For example, the image processor 704 can use image recognition technology to attempt to recognize objects in the photographs and, based on recognized objects, can categorize or type the photographs as shown at 706. Here, the image processor 704 has categorized the series of photographs in four categories—beach, mountain, celebrations, and airplanes.

Once the series of photographs have been categorized, the photograph categories are processed by a music selection module 710 to select music for the various categories. This can be performed in any suitable way. For example, in the illustrated and described embodiment, a music library 712 is utilized to select songs. So, for example, for the beach photographs various beach-type songs, such as songs by the Beach Boys, Hawaiian songs and the like may be selected. For the mountain-type songs, various sounds with a mountain genre might be selected, and so on. These songs can then be used to create a video file 714 that contains the video slideshow accompanied by the selected songs. The video slideshow can be hosted by a server and can be accessible by way of a link that can be shared amongst users.

It is to be appreciated and understood that the process described above is an automatic process that can, but need not necessarily, be performed without human intervention.

Figure 8:
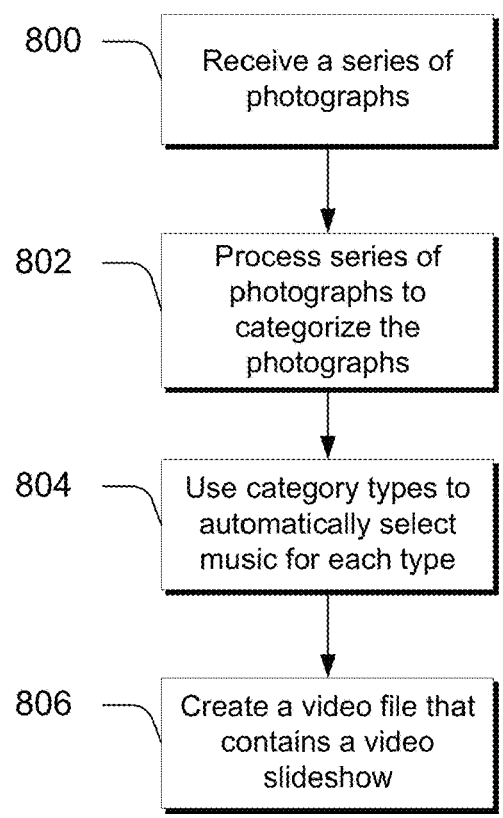
FIG. 8 is a flow diagram that describes steps in a method in accordance with one or more embodiments.

FIG. 8 is a flow diagram that describes steps in a method in accordance with one or more embodiments. The method can be performed in connection with any suitable hardware, software, firmware, or combination thereof. In at least some embodiments, the method can be performed by a suitably-configured computing device, such as the one described below. The computing device can be a local computing device that receives a series of photographs from a wearable camera. Alternately or additionally, the computing device can be one associated with a cloud service that receives a series of photographs by way of a suitably-configured network, such as the Internet.

Step 800 receives a series of photographs. This step can be performed in any suitable way. Step 802 processes the series of photographs, using an image processor, to categorize the photographs into various types. Step 804 uses the various categorized types to automatically select music for each type. This step can be performed in any suitable way. Step 806 creates a video file that contains a video slideshow in which the series of photographs are presented along with music associated the photograph types.

Having considered how music can be selected based on characteristics and properties of a series of photographs, consider now a discussion of how a video slideshow can be presented as a function of characteristics and properties of music. The embodiments about the described can be used by themselves or, alternately or additionally, in connection with the embodiments described above and below.

Figure 9:
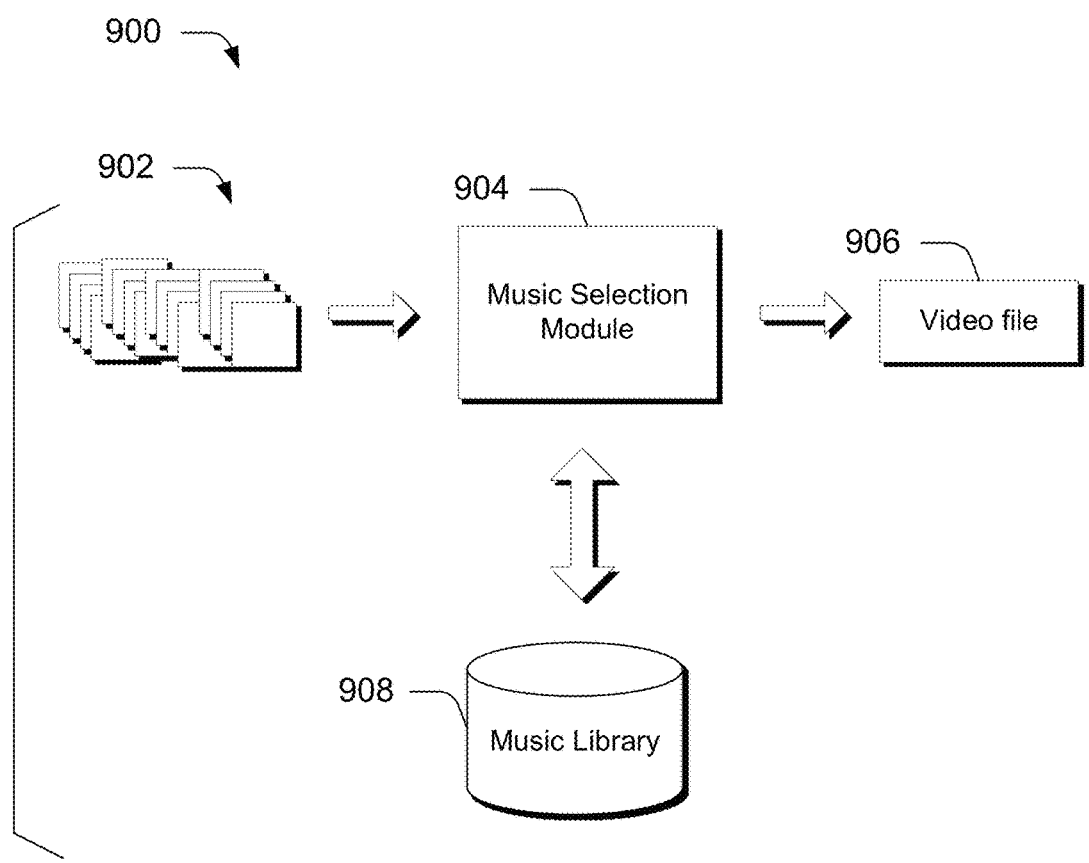
FIG. 9 illustrates an example system in accordance with one or more embodiments.

Presenting the Video Slideshow as a Function of Characteristics and Properties of Music Music, by its very nature, has various characteristics and properties. For example, music has a tempo, beat, rhythm, time signature, loudness or softness, and the like. In accordance with one or more embodiments, music such as songs, can be automatically analyzed to distill various characteristics and properties. These various characteristics and properties can then be used to automatically create a video slideshow in the form of a video file. Specifically, the characteristics and properties of the music can be utilized to present photographs in the video slideshow in a manner that is synchrony with the properties or characteristics. As an example, consider FIG. 9.

There, a system in accordance with one or more embodiments is shown generally at 900. In this example, a series of photographs 902 has been provided by a camera, such as the wearable camera described above. In this example, the series of photographs can be processed in any suitable way. For example, the number of photographs in the set of photographs can be ascertained. Using the music selection module 904, various songs from the music library 908 can be selected and each song's beat can be determined. Based on the beat of the song or songs, a video slideshow can be created and saved to a video file 906. Presentation of the series of photographs in the video slideshow can occur in a manner which is synchronized to the selected music.

Figure 10:
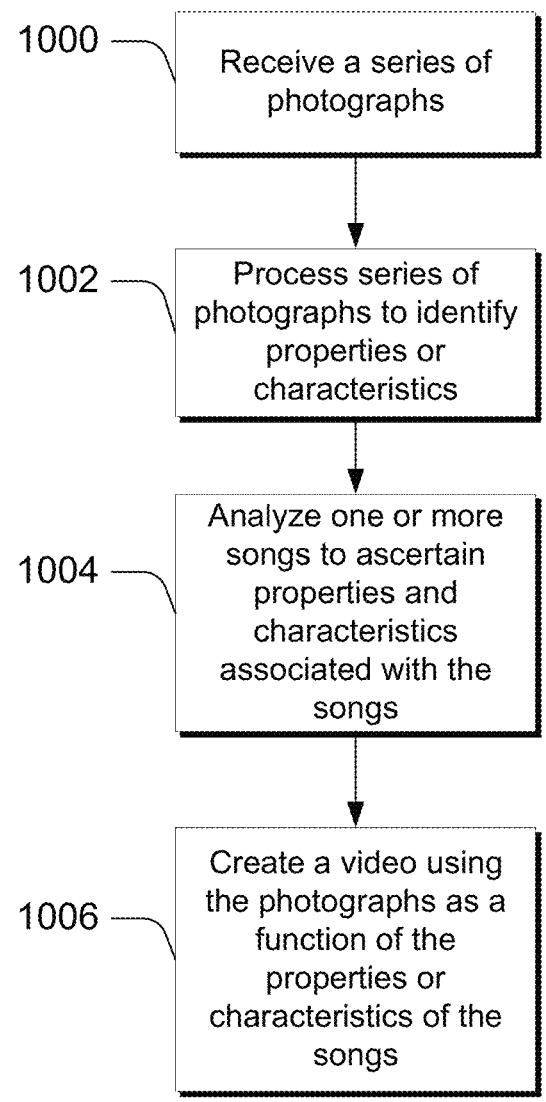
FIG. 10 is a flow diagram that describes steps in a method in accordance with one or more embodiments.

FIG. 10 is a flow diagram that describes steps in a method in accordance with one or more embodiments. The method can be performed in connection with any suitable hardware, software, firmware, or combination thereof. In at least some embodiments, the method can be performed by a suitably-configured computing device, such as the one described below. The computing device can be a local computing device that receives a series of photographs from a wearable camera. Alternately or additionally, the computing device can be one associated with a cloud service that receives a series of photographs from a suitably-configured network, such as the Internet.

Step 1000 receives a series of photographs from, for example, a wearable camera. This step can be performed in any suitable way, examples of which are provided above. Step 1002 processes the series of photographs to identify properties or characteristics associated with the photographs. Any suitable properties or characteristics can be identified. In one embodiment, the properties and characteristics comprise the number of photographs in the series of photographs. Step 1004 analyzes one or more songs to ascertain properties or characteristics associated with the songs. Any suitable properties or characteristics can be utilized. In at least some embodiments, one property or characteristic is the beat of each song. Step 1006 creates a video slideshow using the photographs of the series of photographs as a function of the properties or characteristics of songs selected to accompany slideshow. In the illustrated and described example, photographs in the video slideshow can be presented in a manner that is synchronized with the beat of the particular accompanying music.

Using Geo-Location to Select Songs for a Video Slideshow

In at least some other embodiments, the wearable camera is able to incorporate geo-location in connection with the photos that it takes. Geo-location data can then be used to select music to accompany the video slideshow. The embodiments about to be described can be used in connection with any of the embodiments described herein.

As an example, consider the following. As noted above, the wearable-camera is configured to transmit and receive information. In at least some embodiments, the camera can receive geo-location from the user's cellular phone or smart phone. This can occur through a communication dialogue between the camera and cellular phone or smart phone, assuming that the user has their cellular or smart phone with them. Typically, cellular phones or smart phones can have a GPS unit on board. The cellular phone or smart phone can convey its geo-location, as ascertained by its GPS unit, to the camera. As the camera captures photographs, it can create, for individual photographs, metadata associated with its location as ascertained from the cellular or smart phone. This geo-location information can then be used to select music to accompany video slideshow. As an example, consider the following.

Assume that the user is on vacation in Hawaii. They don their wearable camera to take pictures and document their trip around the island of Oahu. While the series of photographs is being taken by the user's wearable camera, the photographs are created to include metadata associated with the user's location. Now, when the photographs are subsequently processed to produce the video slideshow, the metadata can be analyzed and songs can be selected to coincide with the user's location. In this particular example, songs having a Hawaiian genre can be selected to accompany the presentation of photographs in the video slideshow.

Figure 11:
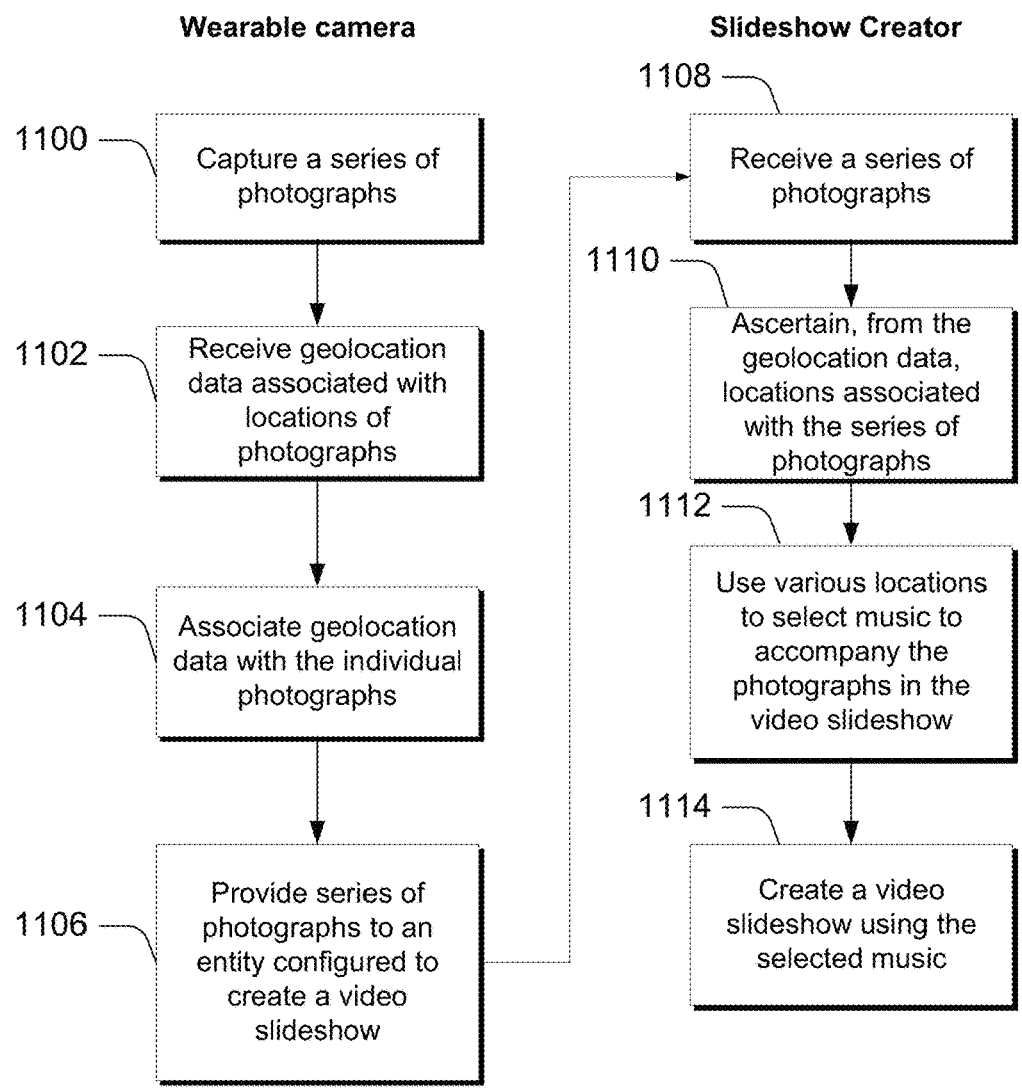
FIG. 11 is a flow diagram that describes steps in a method in accordance with one or more embodiments.

FIG. 11 is a flow diagram that describes steps in another method in accordance with one or more embodiments. The method can be performed in connection with any suitable hardware, software, firmware, or combination thereof. In at least some embodiments, aspects of the method can be performed by a suitably-configured wearable camera, such as the one described above. Other aspects of the method can be performed by a suitably-configured computing device, such as the one described below. The computing device can be a local computing device that receives a series of photographs from a wearable camera. Alternately or additionally, the computing device can be one associated with a cloud service that receives a series of photographs from a suitably-configured network such as the Internet.

Step 1100 captures a series of photographs. This step can be performed in any suitable way, examples of which are provided above. Step 1102 receives geo-location data associated with locations where the series of photographs have been taken. Step 1104 associates the geo-location data with the individual photographs. Step 1106 provides the series of photographs to an entity configured to create a video slideshow.

Step 1108 receives a series of photographs. Step 1110 ascertains, from the geo-location data, locations associated with the series of photographs. Step 1112 uses the various locations to select music to accompany the photographs in the video slideshow. Step 1114 creates the video slideshow using the selected music.

Using Motion Data to Select Music

In some embodiments, motion data associated with the camera can be utilized to select songs that accompany a video slideshow. The motion data can be collected by a suitably-configured motion detector, such as that described above. There, the motion detector includes an accelerometer and/or a gyroscope.

As the camera captures photographs, it can create, for individual photographs, metadata associated with the motion of the camera as ascertained from the motion detector. This motion information can then be used to select music to accompany video slideshow. As an example, consider the following.

Assume that the user, previously on vacation in Hawaii, decides to take a mountain bike tour that has some very steep descents. They don their wearable camera to take pictures and document their mountain bike trip on Oahu. While the series of photographs is being taken by the user's wearable camera, photographs are created to include metadata associated with the camera's motion. So the photographs, through their associated metadata, can convey the speed and motion of the wearable camera. Now, when the photographs are subsequently processed to produce the video slideshow, the metadata can be analyzed and songs can be selected to coincide with or are otherwise associated with the speed or motion of the camera. In this particular example, for those stretches of the mountain bike tour that are particularly fast and downwardly steep, appropriate songs, such as Metal Gear Solid, might be selected. For other stretches of the tour that are particularly arduous and perhaps upwardly steep, slower songs such as the Theme from Rocky might be selected.

Figure 12:
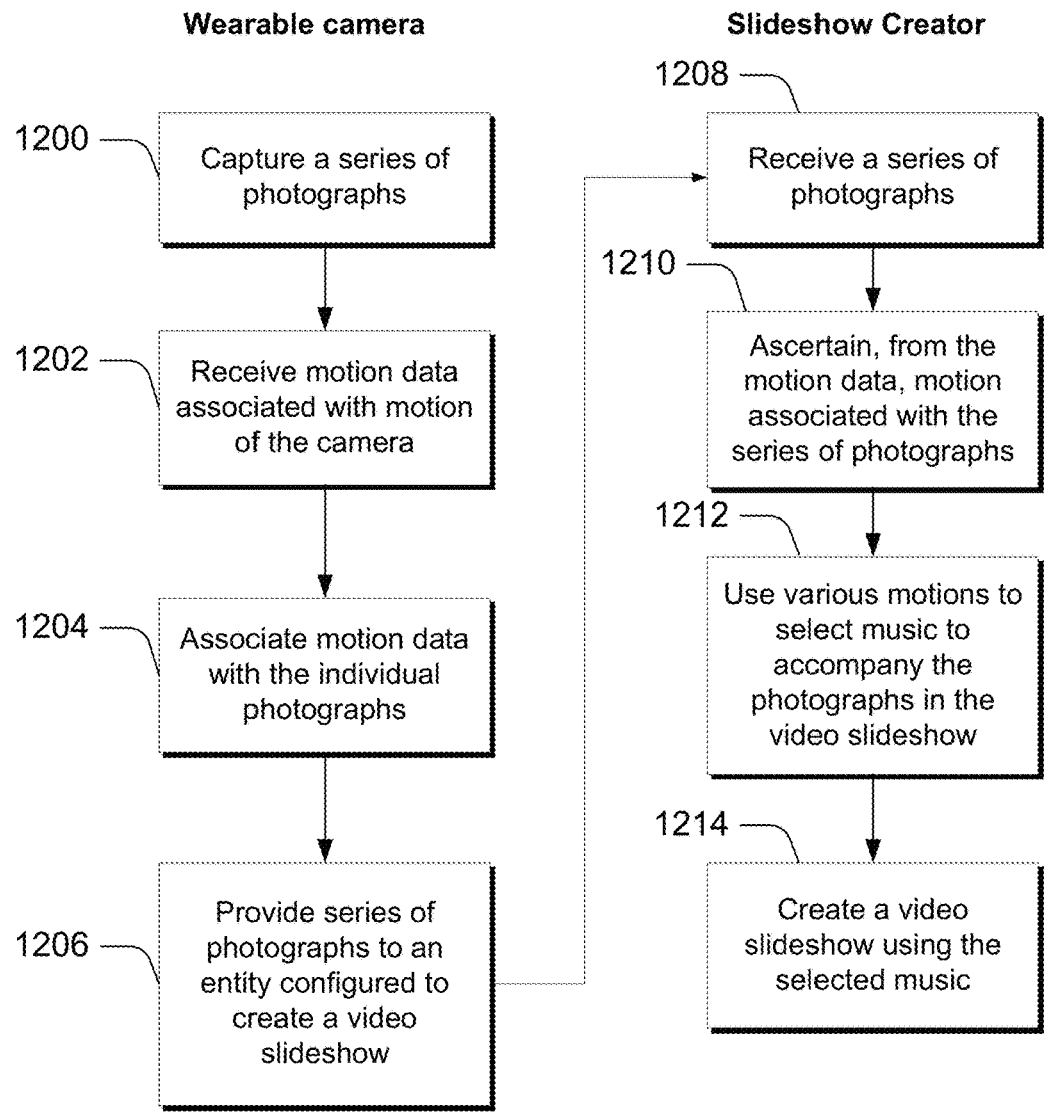
FIG. 12 is a flow diagram that describes steps in a method in accordance with one or more embodiments.

FIG. 12 is a flow diagram that describes steps in a method in accordance with one or more embodiments. The method can be performed in connection with any suitable hardware, software, firmware, or combination thereof. In at least some embodiments, aspects of the method can be performed by a suitably-configured wearable camera such as the one described above. Other aspects of the method can be performed by a suitably-configured computing device, such as the one described below. The computing device can be a local computing device that receives a series of photographs from a wearable camera. Alternately or additionally, the computing device can be one associated with a cloud service that receives a series of photographs from a suitably-configured network such as the Internet.

Step 1200 captures a series of photographs. This step can be performed in any suitable way, examples of which are provided above. Step 1202 receives motion data associated with motion of the camera. Step 1204 associates the motion data with the individual photographs. Step 1206 provides the series of photographs to an entity configured to create a video slideshow.

Step 1208 receives a series of photographs. Step 1210 ascertains, from the motion data, motion associated with the series of photographs. Step 1212 uses the various motion data to select music to accompany the photographs in the video slideshow. Step 1214 creates the video slideshow using the selected music.

In at least some embodiments, a frame-skipping feature can be included. For example, if the user remains relatively motionless for long periods of time while the camera is taking pictures, the same picture will be taken over and over again. In these instances, the camera's image processor can remove similar pictures. Alternately or additionally, the entity that creates the slideshow can detect and remove these similar pictures.

Having considered various embodiments, consider now embodiments of a so-called smart gallery.

Smart Gallery

The smart gallery functionality is designed to create a short summary view of a collection of content, such as photographs and video. The smart gallery functionality can mitigate problems associated with simply presenting large collections of content in, for example, a thumbnail view where contextual relevance of the content can become lost. Thus, as will become apparent below, smart gallery functionality provides a way to intelligently present large volumes of content to a user in a pleasing way.

The smart gallery functionality can be employed as a standalone functionality that can be used to process large amounts of photos and video. Alternately or additionally, the smart gallery functionality can be used in connection with the photo log feature described above, which can produce large amounts of photos. Alternately or additionally, the smart gallery functionality can be used in connection with the music video slideshow functionality described above. Specifically, as will become apparent below, the smart gallery functionality can be used to define a collection of photographs and video that can be consumed by an end user. The music video slideshow functionality can then be used to layer relevant music on top of the content collection presented by the smart gallery to provide an immersive, contextually-relevant user experience.

In the illustrated and described embodiment, the smart gallery functionality can be implemented by software that resides on any suitably-configured computing device. For example, the smart gallery functionality can be implemented by a client application on a local end-user computing device that receives or otherwise contains a collection of content, such as photos and/or videos. Alternately or additionally, the smart gallery functionality can be implemented by a remote computing device such as one that is provided as a cloud service by way of the Internet. Alternately or additionally, the smart gallery functionality can be implemented in a distributed fashion where aspects of the functionality are performed by one computing device while other aspects of the functionality are performed by another different computing device.

The smart gallery functionality can be thought of as including two stages. A first of the stages is referred to as a "set up stage" and a second of the stages is referred to as "consumption stage".

The set up stage refers to the stage at which a collection of content, from whatever source, is analyzed and processed to provide a collection of photographs and video which are to be presented in a user interface referred to as a "smart gallery user interface." The consumption stage refers to the stage that is designed to enable a user to edit and/or otherwise interact with content that is presented in the smart gallery. Against the backdrop of these two stages, the smart gallery functionality can provide multiple different approaches for handling content. A first of the approaches utilizes a prioritization scheme based on whether content is manually captured or automatically captured, as by the photo log feature described above. A second of the approaches utilizes various image processing techniques that are designed to promote or demote content based on various processing parameters.

However, before considering the various approaches, consider a smart gallery user interface in accordance with one or more embodiments.

Smart Gallery User Interface

Figure 13:
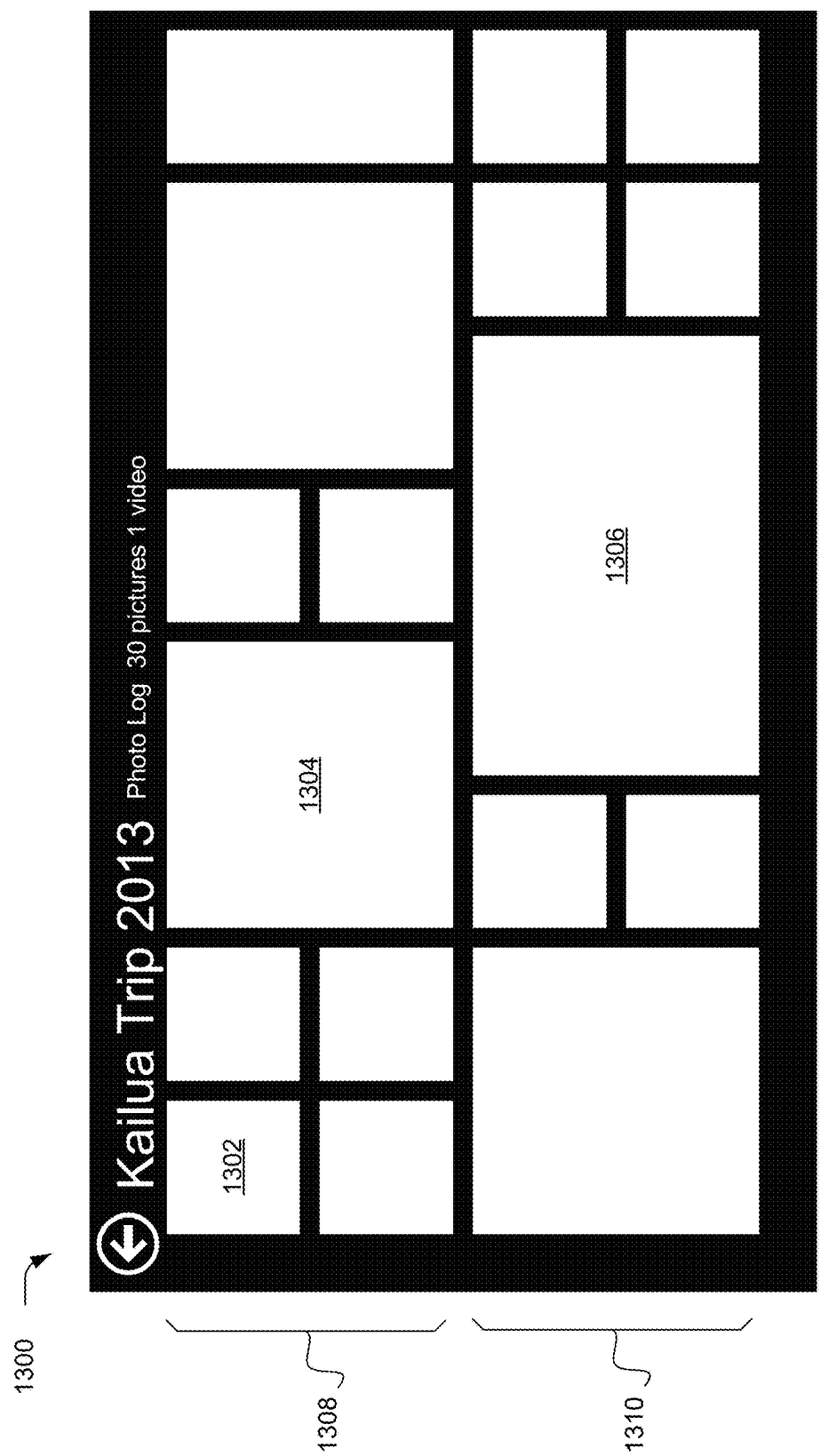
FIG. 13 illustrates a smart gallery in accordance with one or more embodiments.

FIG. 13 illustrates a smart gallery user interface in accordance with one or more embodiments generally at 1300. In the illustrated and described embodiment, the smart gallery user interface 1300 is composed of gallery elements examples of which are shown at 1302, 1304, and 1306. The gallery elements can be thought of as containers for holding content such as photos and video. Each gallery element can hold multiple pieces of content for presentation to a user. In the illustrated and described embodiment, the gallery elements can vary in size. In this particular example, three different sizes of gallery elements are shown. A first smaller element—here gallery element 1302—is a square. A second somewhat larger gallery element—here gallery element 1304—is a larger square. A third gallery element—here gallery element 1306—is a rectangle. In this embodiment, the square gallery elements are designed to hold photos, while the rectangular gallery element is designed to hold video that may or may not run silently in the background.

It is to be appreciated and understood that the specific structure of the smart gallery user interface 1300 is for purposes of example only. Other structures of gallery elements can be utilized without departing from the spirit and scope of the claimed subject matter.

Having considered an example smart gallery user interface, consider now various approaches that can be used to enable set up and consumption of content using the illustrated smart gallery user interface.

First Approach

As noted above, a first of the approaches for enabling set up and consumption of content utilizes a prioritization based on whether content is manually captured or automatically captured, as by the photo log feature described above.

The photo log feature described above enables a user to define a time interval that is used to automatically capture photographs. Thus, by defining a particular interval, for example 2 minutes, a photograph is automatically taken and saved. Accordingly, if the camera device taking the photographs is a wearable camera as described above, the user's day can be documented by a series of photographs taken throughout the day at the interval defined by the user.

However, throughout the day the user may see something of interest that they wish to document by manually capturing a photograph or video. Thus, the user may manually take a photograph or may manually record video during the time in which photographs are being automatically captured. When this occurs, the first approach's set up stage makes an assumption that manually captured photographs or video are more important to the user than those that are automatically captured. Once priorities have been assigned in accordance with this approach, the consumption stage can now present the content.

Presentation of the content using this approach places manually captured photographs and video in larger gallery elements than automatically captured photographs or video. In addition, in one or more embodiments the content can be laid out in chronological order, from left to right. For example, each piece of content can include a timestamp and this timestamp can be used to ascertain the relative chronology of the content. The content can then be laid out in chronological order.

For example, considering the smart gallery user interface in FIG. 13, two rows 1308 and 1310 are defined. A row, in this example, is defined as the height of two small gallery elements. Thus, as one moves from left to right in row 1308, the content advances through time. The timeline continues as one moves to row 1310 where, in the same manner, as one moves from left to right the content continues to advance through time. It is to be appreciated and understood, however, that any suitable way of presenting content in chronological order can be utilized without departing from the spirit and scope of the claimed subject matter.

Figure 14:
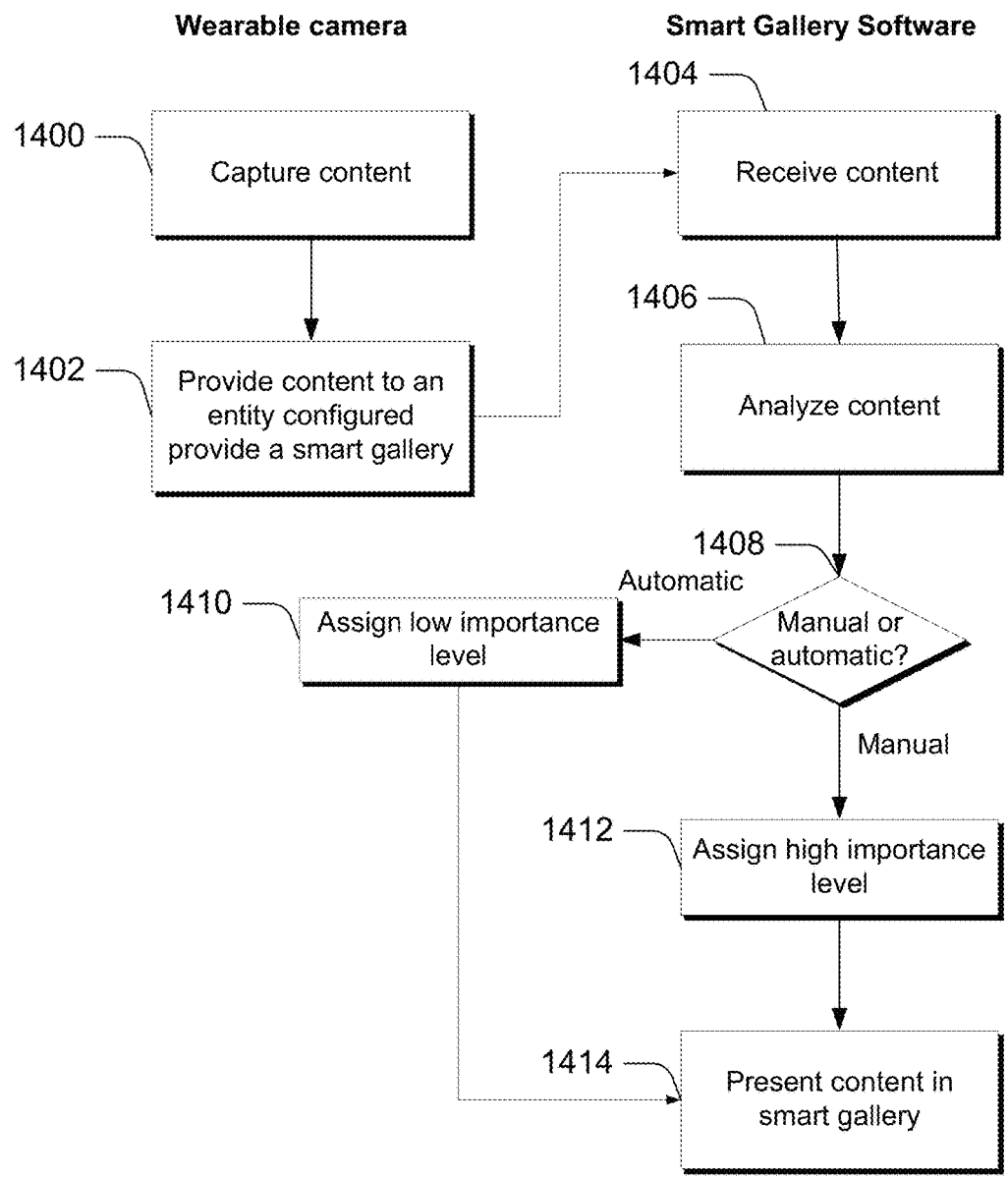
FIG. 14 is a flow diagram that describes steps in a method in accordance with one or more embodiments.

FIG. 14 is a flow diagram that describes steps in a method in accordance with one or more embodiments. The method can be performed in connection with any suitable hardware, software, firmware, or combination thereof. In at least some embodiments, aspects of the method can be performed by a suitably-configured wearable camera, such as the one described above. Other aspects of the method can be performed by a suitably-configured computing device, such as the one described below. The computing device can be a local computing device that receives a series of photographs from a camera, such as a wearable camera. Alternately or additionally, the computing device can be one associated with a cloud service that receives a series of photographs and/or video from a suitably-configured network such as the Internet.

Step 1400 captures content. This step can be performed in any suitable way. For example, in at least some embodiments, the content can be captured in the form of photographs and/or video that is captured by camera, such as the wearable camera described above. Step 1402 provides the content to an entity configured to provide a smart gallery, here designated as "smart gallery software." As noted above, the smart gallery software can reside on a local end-user device or, alternately or additionally, on a remote device such as a cloud service.

Step 1404 receives the content and step 1406 analyzes the content. In one or more embodiments analysis of content can include ascertaining whether the content has been manually captured or has been automatically captured. If, at step 1408, the content is ascertained to have been automatically captured, step 1410 assigns a low importance level to the content. Alternately, if the content has been manually captured, step 1412 assigns a high importance level to the content. Step 1414 then enables presentation or presents the content in a smart gallery in accordance with the contents' importance level. The step can be performed in any suitable way. For example, in the example described above, content that was deemed more important, e.g., manually captured content, was presented in larger gallery elements than content that was deemed less important, e.g., automatically captured content.

Having considered a first approach in accordance with one or more embodiments, consider now a second approach in accordance with one or more embodiments.

Second Approach

As noted above, a second of the approaches for enabling set up and consumption of content utilizes various image processing techniques that are designed to promote or demote content based on various processing parameters.

In one or more embodiments, the second approach can more easily handle larger amounts of content than the first approach. It can do so by using, among other techniques, various image processing techniques to ascertain whether to promote or demote content. Promotion and demotion of content can take into account such things as content quality and perceived content relevance. In accordance with the described embodiments, the image processing techniques can process the content and assign a numerical value based on the processing. This numerical value can be used to prioritize the content for display.

With respect to promotion of content, consider the following. In many instances, the subject matter of the content being processed can be used to assign a higher priority to the content. That is, content that includes particular items or objects may be of more interest to various users. For example, content that includes faces or particular facial expressions can be of more interest to users than content that does not include faces or particular facial expressions. Thus, the image processing techniques can process the content in an attempt to identify faces or particular facial expressions. Any suitable face detection algorithms can be utilized. Examples of principles upon which face detection algorithms are built can be found in the following references: U.S. Pat. Nos. 7,689,033; 7,590,267; 7,324,671; 7,190,829; 7,099,504; 7,050,607; 6,804,391; and 6,792,135, all of which are assigned to the assignee of this document. It is to be appreciated and understood, however, that while face detection is provided as an example, other objects that appear within particular content can be the focus of whether the content is promoted or not.

In addition to object or item recognition, the similarity between individual pieces of content can be used to promote particular items of similar content. For example, assume that multiple pieces of content include the same or similar subject matter. For example, 15 photos may include an image of the same farm. In this instance, image processing techniques can be utilized to determine the photo with the highest quality and promote that photo by assigning it a higher priority than any other of the photos of the farm.

Other techniques can be utilized to promote content without departing from the spirit and scope of the claimed subject matter.

With respect to demotion of content, consider the following. In accordance with one or more embodiments, the image processing techniques can be utilized to demote content in accordance with various parameters. For example, the content can be analyzed and for content that appears blurred or is of poor quality, such content can have lower priorities assigned to it. Content can be of poor quality by being too dark, too bright, underexposed, overexposed, and the like. Any suitable type of image processing techniques can be utilized. For example, with respect to content analysis that looks for blurred content, the following references describe various approaches that can be utilized: (1) Tong et al., Blur Detection for Digital Images Using Wavelet Transform, Multimedia and Expo, 2004, IEEE International Conference on Jun. 27-30, 2004, Volume 1, pgs. 17-20; and (2) U.S. Pat. No. 7,257,273, to name just a few.

In one or more embodiments, the second approach can also take into account whether content was automatically captured or manually captured to factor into a particular piece of content's priority, as described above.

After the content has been analyzed and priority values have been assigned to the individual pieces of content, the visual layout in the smart gallery can use the priority values to increase or decrease the size of the particular photo or content.

Figure 15:
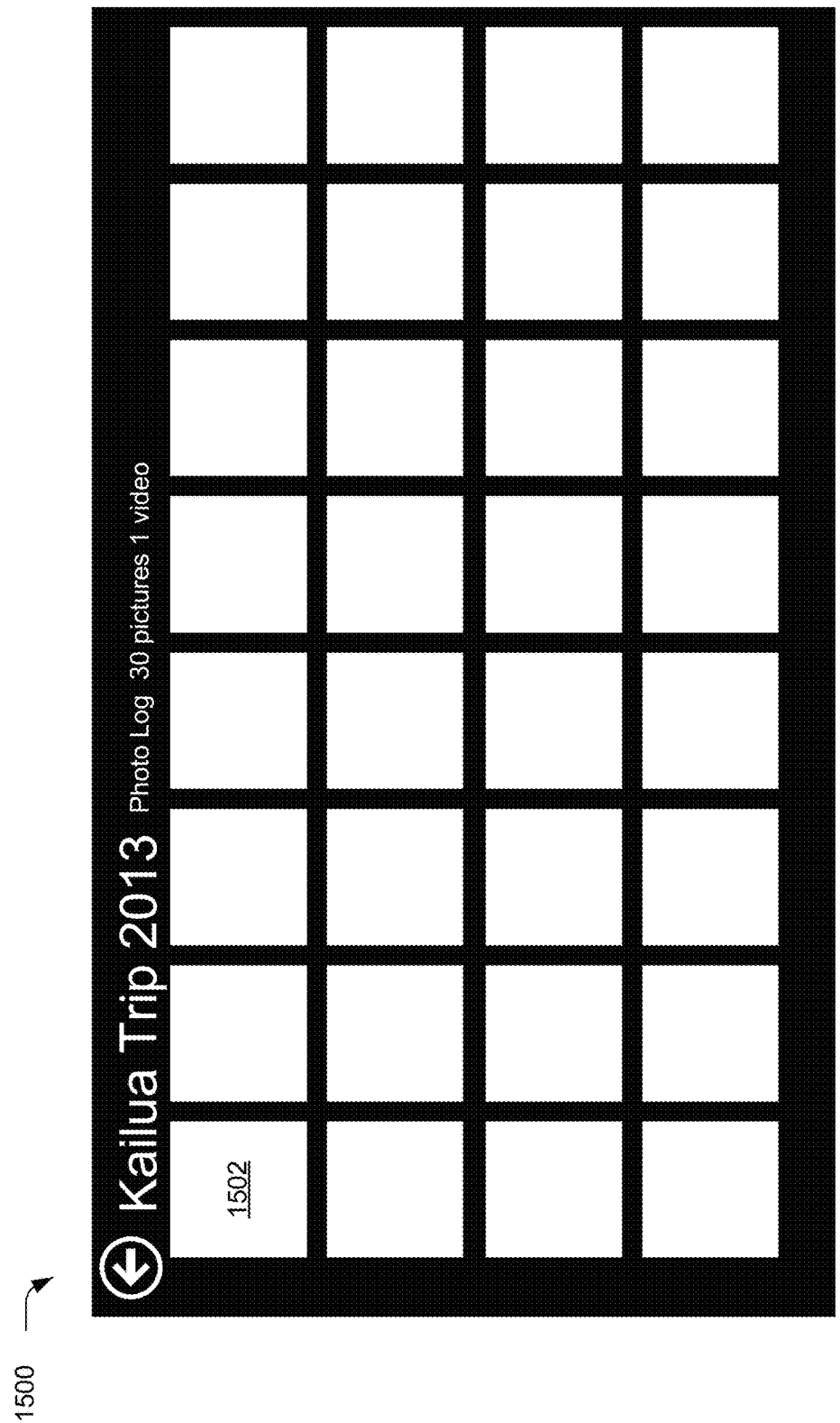
FIG. 15 illustrates aspects of a smart gallery in accordance with one or more embodiments.

In one or more embodiments, the smart gallery can have any suitable type of layout structure in terms of the dimensions of the gallery elements. In at least some embodiments, the smart gallery has a preset size which means that the gallery size is not determined by the number of photos or video, but rather is held to a size that makes it easily viewable. Preliminarily, the preset size is translated into a grid of evenly sized gallery elements. As an example, consider FIG. 15. There, a grid is shown generally at 1500 and includes a plurality of squares that define individual gallery elements, an example of which is shown at 1502. Each of the squares has a same size before the grid has been populated with content. In this example, a small photo, such as one having a lower level of importance or priority, occupies a single square or gallery element. More important photos such as those that carry higher levels of importance or priority occupy four squares. In this particular example, videos occupy six squares.

Any suitable type of algorithm can be utilized for mapping content, such as photos and videos, to the individual gallery elements. For example, in this particular embodiment, once the image processing techniques have been utilized to prioritize the content and each piece of content has been assigned a priority value, this information can be utilized to ascertain which content is to be used to populate the smart gallery. In addition, a threshold value or values can be utilized to ascertain the number of squares a particular piece of content is to occupy.

Once the content has been analyzed and the thresholds have been employed to ascertain which content is to appear in the smart gallery, the number of gallery elements is defined and known.

The content can now be presented in the smart gallery user interface and the user can interact with their content, as described below in more detail.

In one or more embodiments, each piece of content has a time associated with it. This time corresponds to the time when the content was captured. In these embodiments, the smart gallery can be "time-boxed", meaning that the content within the gallery elements can be presented in a chronological order so that the content flows in a time-ordered manner. As an example, consider the following.

In at least some embodiments, each gallery element can include multiple pieces of content. With respect to the collection of content that is to appear in the smart gallery, there is an associated start time corresponding to the first-captured piece of content, and an associated end time corresponding to the last-captured piece of content. The start time and end time form a time continuum and each gallery element can be assigned a sub-range of the time continuum. For each sub-range of the time continuum, the corresponding gallery element is assigned content that falls within the sub-range. The corresponding gallery elements can now select the piece of content within its sub-range having the highest priority value for presentation to the user. So, for example, an individual gallery element may have four assigned photos that were captured within its associated time sub-range. The photo having the highest priority of the four photos can be selected for presentation within the smart gallery user interface.

Figure 16:
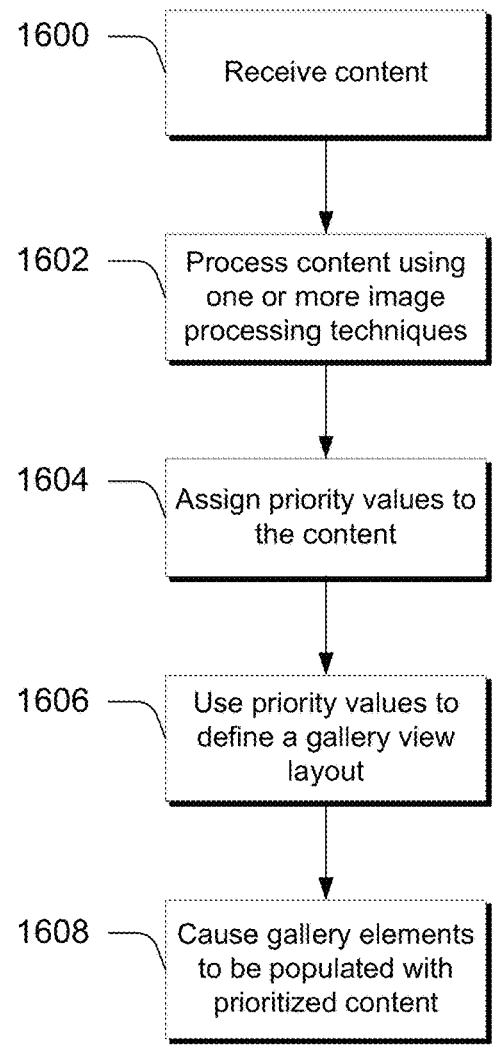
FIG. 16 is a flow diagram that describes steps in a method in accordance with one or more embodiments.

FIG. 16 is a flow diagram that describes steps in a method in accordance with one or more embodiments. The method can be performed in connection with any suitable hardware, software, firmware, or combination thereof. In at least some embodiments, aspects of the method can be performed by a suitably-configured computing device, such as the one described below. The computing device can be a local computing device that receives a series of photographs or content from a camera, such as a wearable camera. Alternately or additionally, the computing device can be one associated with a cloud service that receives a series of photographs and/or video via a suitably-configured network such as the Internet.

Step 1600 receives content. This step can be performed in any suitable way. For example, in at least some embodiments, content can be received by a local client device from, for example, a camera such as the wearable camera described above. Alternately or additionally, the content can be received by a remote computing device such as one that is utilized by a cloud service. Step 1602 processes the content using one or more image processing techniques. Examples of image processing techniques are described above. Based on the processing of the content, step 1604 assigns priority values to the content. Examples of how this can be done are provided above. Step 1606 uses the priority values to define a gallery view layout. For example, the priority values can be used to define which content is to appear in the gallery view layout, also termed the "smart gallery." In addition to defining which content is to appear in the gallery view layout, at least some embodiments utilize the priority values to define the sizes of the gallery elements in the gallery view layout. Examples of gallery elements and their associated properties and characteristics are provided above. Step 1608 causes gallery elements to be populated with prioritized content. This step can be performed in any suitable way. For example, in embodiments where processing takes place on a local computing device, this step can be performed by populating content contained on the local computing device into the associated gallery elements. In embodiments where processing takes place remotely such as, for example, by a cloud service, this step can be performed by indicating to the local computing device which content is to appear in which gallery elements.

Having described how content can be analyzed and populated into a smart gallery user interface, consider now various consumption scenarios in which a user can edit and/or otherwise interact with the content within the smart gallery.

Consumption Scenarios

Consumption scenarios pertain to the various manners in which a user can interact with content that appears in the smart gallery user interface. Consumption scenarios are many and varied, and the examples described below are not intended to be limiting in any sense. Rather, the consumption scenarios are intended to illustrate some, but not all examples of how a user can interact with their content.

In at least some embodiments, the gallery elements include multiple pieces of content, such as photos. By clicking on a particular gallery element, users can advance through the content that appears within that gallery element. So, for example, in embodiments where the highest priority piece of content is displayed in the gallery element, by clicking on the particular gallery element, the user can advance through other lower priority content that may fall within the time sub-range assigned for that gallery element.

In at least some embodiments, the user can interact with the smart gallery and open a view that displays all of the content assigned for the smart gallery. The user can then drag and drop a previously-hidden piece of content into a gallery element of choice. So, for example, a user may pull up a standard thumbnail view of all the photos that are assigned to the smart gallery. Next to the thumbnail view, an unpopulated smart gallery user interface can be displayed, such as that which appears in FIG. 15. The user can now drag and drop individual pieces of content into the gallery elements. In this manner, the user can customize their smart gallery to include top elements of their own choosing.

In addition, in at least some embodiments, the user can select content to move from between different sized gallery elements. For example, a photo that appears in a small gallery element may be moved to a larger gallery element by the user. In this instance, the moved photo may have its priority elevated by virtue of the user moving it to a higher-priority gallery element.

In at least some embodiments, content can be shared in a social networking-fashion with other users over a network such as the Internet. In these instances, the other users may vote for piece of content to increase its priority. For example, the other users can "like" a piece of content to cause its priority to be elevated. This, in turn, can affect the manner in which the content is displayed in the smart gallery user interface.

In at least some embodiments, the smart gallery can be configured to automatically advance through content to provide a slideshow for the user. So, for example, individual gallery elements can automatically advance through the content that has been assigned to it. This can be done in various ways. For example, all of the gallery elements can automatically advance at the same time and pause for a period of time to allow the user to enjoy their content. Alternately or additionally, the gallery elements may individually automatically advance in a cascading, waterfall-like fashion. So, for example, a leftmost gallery element may "flip" content and then the adjacent gallery element may flip content, and so on. The effect of this presentation is a domino-like presentation of content.

In various other embodiments, other types of user input can be provided to advance through content that appears in the smart gallery. For example, for touch-enabled devices, a user may cycle through content by touch-engaging particular gallery elements. Alternately or additionally, by swiping a finger across the screen, those gallery elements that appear under the user's finger may flip their content. In other scenarios, input can be provided through a natural user interface in which a user does not physically touch the screen, but rather provides gestural input through motion that is captured by a device's camera and translated into an input to the smart gallery. For example, a user may have their smart gallery displayed on a high-definition widescreen TV. By pointing a finger at a particular gallery element and then swiping their hand, the gallery element may be caused to advance. This constitutes but one example of how a natural user interface can be used to advance through content in the smart gallery. As such, other natural user interface input can be provided without departing from the spirit and scope of the claimed subject matter.

Having considered various embodiments, consider now a discussion of an example device that can be utilized to create a video slideshow as described above.

Example Device

Figure 17:
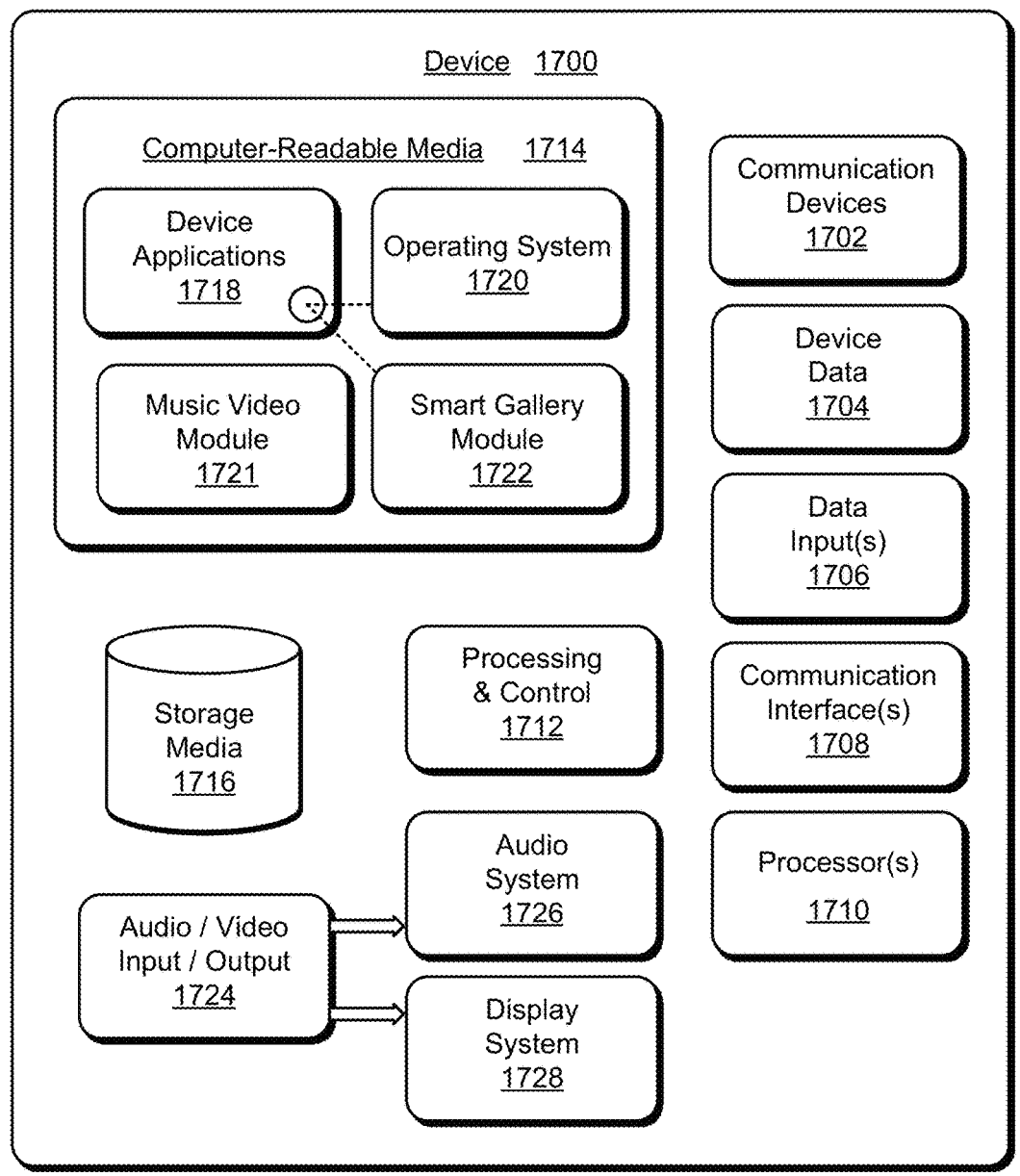
FIG. 17 illustrates an example device in accordance with one or more embodiments.

FIG. 17 illustrates various components of an example device 1700 that can be implemented as any type of portable and/or computer device to implement the embodiments described herein. Device 1700 includes communication devices 1702 that enable wired and/or wireless communication of device data 1704 (e.g., received data, data that is being received, data scheduled for broadcast, data packets of the data, etc.). The device data 1704 or other device content can include configuration settings of the device, media content stored on the device, and/or information associated with a user of the device. Media content stored on device 1700 can include any type of audio, video, and/or image data. Device 1700 includes one or more data inputs 1706 via which any type of data, media content, and/or inputs can be received, such as user-selectable inputs, messages, music, television media content, recorded video content, and any other type of audio, video, and/or image data received from any content and/or data source.

Device 1700 also includes communication interfaces 1708 that can be implemented as any one or more of a serial and/or parallel interface, a wireless interface, any type of network interface, a modem, and as any other type of communication interface. The communication interfaces 1708 provide a connection and/or communication links between device 1700 and a communication network by which other electronic, computing, and communication devices communicate data with device 1700.

Device 1700 includes one or more processors 1710 (e.g., any of microprocessors, controllers, and the like) which process various computer-executable or readable instructions to control the operation of device 1700 and to implement the embodiments described above. Alternatively or in addition, device 1700 can be implemented with any one or combination of hardware, firmware, or fixed logic circuitry that is implemented in connection with processing and control circuits which are generally identified at 1712. Although not shown, device 1700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1700 also includes computer-readable media 1714, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1700 can also include a mass storage media device 1716.

Computer-readable media 1714 provides data storage mechanisms to store the device data 1704, as well as various device applications 1718 and any other types of information and/or data related to operational aspects of device 1700. For example, an operating system 1720 can be maintained as a computer application with the computer-readable media 1714 and executed on processors 1710. The device applications 1718 can include a device manager (e.g., a control application, software application, signal processing and control module, code that is native to a particular device, a hardware abstraction layer for a particular device, etc.), as well as other applications that can include, web browsers, image processing applications, communication applications such as instant messaging applications, word processing applications and a variety of other different applications. The device applications 1718 also include any system components or modules to implement embodiments of the techniques described herein. In this example, the device applications 1718 can include a music video module 1721 and a smart gallery module 1722 that operate as described above.

Device 1700 also includes an audio and/or video input-output system 1724 that provides audio data to an audio system 1726 and/or provides video data to a display system 1728. The audio system 1726 and/or the display system 1728 can include any devices that process, display, and/or otherwise render audio, video, and image data. Video signals and audio signals can be communicated from device 1700 to an audio device and/or to a display device via an RF (radio frequency) link, S-video link, composite video link, component video link, DVI (digital video interface), analog audio connection, or other similar communication link. In an embodiment, the audio system 1726 and/or the display system 1728 are implemented as external components to device 1700. Alternatively, the audio system 1726 and/or the display system 1728 are implemented as integrated components of example device 1700.

CONCLUSION

Various embodiments provide a so-called smart gallery that is designed to create a short summary view of a collection of content, such as photographs and video. The content can be prioritized and presented in a smart gallery user interface that includes gallery elements that can be sized in accordance with prioritized content. Prioritization can take place based on whether content is manually captured or automatically captured. Alternately or additionally, prioritization can take place based on content analysis that looks at content quality and/or objects that appear in the content.

Various embodiments provide a wearable camera that can be worn by a user. In one or more embodiments, the wearable camera can automatically take a series of photos and save those photos on the camera. The series of photos can be analyzed for various characteristics and properties. These characteristics and properties can be used to automatically select music from a music library. The music can then be used to create a video slideshow that includes music tailored to the characteristics and properties of the pictures. A link to an associated video file can be provided for sharing the video slideshow.

In other embodiments, characteristics and properties of music can be analyzed and music can be selected for a video slideshow. The video slideshow can be presented with the music as a function of the characteristics and properties of the music. For example, a beat of the accompanying music can be detected and the photos can be changed in a manner that is beat-matched to the accompanying music.

Although the embodiments have been described in language specific to structural features and/or methodological acts, it is to be understood that the various embodiments defined in the appended claims are not necessarily limited to the specific features or acts described. Rather, the specific features and acts are disclosed as example forms of implementing the various embodiments.

What is claimed is:

1. A computer implemented method comprising:
   receiving content that has been captured by a camera;
   analyzing the content to ascertain whether the content has been manually captured or automatically captured;
   responsive to the content being automatically captured, assigning a low importance level to the content;
   responsive to the content being manually captured, assigning a high importance level to the content; and
   enabling presentation of the content in a gallery in accordance with the importance level of the content.

2. The computer implemented method of claim 1, wherein said enabling presentation comprises enabling presentation of manually captured content in gallery elements that are larger than gallery elements used to present automatically captured content.

3. The computer implemented method of claim 1, wherein said enabling presentation comprises enabling presentation of the content as a music video slideshow.

4. The computer implemented method of claim 1, wherein said enabling presentation comprises enabling presentation of the content in chronological order.

5. The computer implemented method of claim 1, wherein the content includes both photographs and video.

6. The computer implemented method of claim 1, wherein the camera comprises a wearable camera.

7. The computer implemented method of claim 6, wherein the content is automatically captured using a photo log feature that automatically captures content at particular time intervals.

8. A computing device comprising:
   at least a memory and a processor to perform operations comprising:
   analyzing content, that has been captured by a camera, to ascertain whether the content has been manually captured or automatically captured;
   responsive to the content being automatically captured, assigning a low importance level to the content;
   responsive to the content being manually captured, assigning a high importance level to the content; and
   enabling presentation of the content in a gallery in accordance with the importance level of the content.

9. The computing device of claim 8, wherein said enabling presentation comprises enabling presentation of manually captured content in gallery elements that are larger than gallery elements used to present automatically captured content.

10. The computing device of claim 8, wherein said enabling presentation comprises enabling presentation of the content as a music video slideshow.

11. The computing device of claim 8, wherein said enabling presentation comprises enabling presentation of the content in chronological order.

12. The computing device of claim 8, wherein the content includes both photographs and video.

13. The computing device of claim 8, wherein the camera comprises a wearable camera.

14. The computing device of claim 13, wherein the content is automatically captured using a photo log feature that automatically captures content at particular time intervals.

15. One or more computer readable storage memories comprising computer readable instructions which, when executed, implement a method comprising:
   analyzing content, that has been captured by a camera, to ascertain whether the content has been manually captured or automatically captured;
   responsive to the content being automatically captured, assigning a low importance level to the content;
   responsive to the content being manually captured, assigning a high importance level to the content; and enabling presentation of the content in a gallery in accordance with the importance level of the content.

16. The one or more computer readable storage memories of claim 15, wherein said enabling presentation comprises enabling presentation of manually captured content in gallery elements that are larger than gallery elements used to present automatically captured content.

17. The one or more computer readable storage memories of claim 15, wherein said enabling presentation comprises enabling presentation of the content as a music video slideshow.

18. The one or more computer readable storage memories of claim 15, wherein said enabling presentation comprises enabling presentation of the content in chronological order.

19. The one or more computer readable storage memories of claim 15, wherein the content includes both photographs and video.

20. The one or more computer readable storage memories of claim 15, wherein the camera comprises a wearable camera.

* * * * *